US011609945B2

(12) United States Patent
Javier et al.

(10) Patent No.: US 11,609,945 B2
(45) Date of Patent: *Mar. 21, 2023

(54) DYNAMICALLY RANKING MEDIA EFFECTS BASED ON USER AND DEVICE CHARACTERISTICS

(71) Applicant: Meta Platforms, Inc., Menlo Park, CA (US)

(72) Inventors: Laura Ling Javier, San Francisco, CA (US); Sachin Monga, San Francisco, CA (US); Kristina Varshavskaya, San Francisco, CA (US); Daniil Burdakov, London (GB); Ittai Sean Barzilay, San Francisco, CA (US); Volodymyr Giginiak, London (GB); Harshdeep Singh, Santa Clara, CA (US); Connor C Hayes, Napa, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/537,315

(22) Filed: Nov. 29, 2021

(65) Prior Publication Data

US 2022/0083584 A1 Mar. 17, 2022

Related U.S. Application Data

(63) Continuation of application No. 16/853,324, filed on Apr. 20, 2020, now Pat. No. 11,204,956, which is a
(Continued)

(51) Int. Cl.
*G06F 16/44* (2019.01)
*G06F 3/0481* (2022.01)
(Continued)

(52) U.S. Cl.
CPC ............ *G06F 16/44* (2019.01); *G06F 3/0481* (2013.01); *G06F 3/0482* (2013.01);
(Continued)

(58) Field of Classification Search
CPC ........... G06F 17/3053; G06F 17/30058; G06F 3/0482; H04N 5/265; H04N 5/23293; H04N 5/23216
See application file for complete search history.

(56) References Cited

U.S. PATENT DOCUMENTS 10,382,373 B1 * 8/2019 Yang .................... G06F 16/954
10,515,108 B2 12/2019 Javier et al.
(Continued)

OTHER PUBLICATIONS

Non-Final Office Action dated May 11, 2021 for U.S. Appl. No. 16/853,324, filed Apr. 20, 2020, 26 Pages.
(Continued)

*Primary Examiner* — Christopher K Peterson
(74) *Attorney, Agent, or Firm* — Keller Preece PLLC

(57) ABSTRACT

The present disclosure is directed toward systems and methods for ranking media effects. For example, systems and methods described herein enable a user to select and apply one or more media effects to a media communication such as a digital photograph or video. Systems and methods described herein identify and rank media effects based on characteristics associated with the user and the user's client-computing device. Furthermore, systems and methods described herein automatically present the top-ranked media effects to the user such that the user can easily select and apply one or more media effects that are tailored specifically to the user.

20 Claims, 10 Drawing Sheets

Related U.S. Application Data continuation of application No. 16/716,344, filed on Dec. 16, 2019, now Pat. No. 11,017,012, which is a continuation of application No. 15/395,755, filed on Dec. 30, 2016, now Pat. No. 10,515,108.

(51) Int. Cl.
    *G06F 3/0482*     (2013.01)
    *G06F 16/2457*     (2019.01)
    *G11B 27/00*     (2006.01)
    *H04N 5/232*     (2006.01)
    *H04N 5/262*     (2006.01)
    *G11B 27/031*     (2006.01)
    *G11B 27/34*     (2006.01)

(52) U.S. Cl.
    CPC ........ *G06F 16/24578* (2019.01); *G11B 27/00* (2013.01); *H04N 5/23293* (2013.01); *H04N 5/232935* (2018.08); *H04N 5/2621* (2013.01)

(56) References Cited

U.S. PATENT DOCUMENTS

| | | | |
|---|---|---|---|
| 11,017,012 B2 * | 5/2021 | Javier | ................. G11B 27/34 |
| 2013/0195429 A1 | 8/2013 | Fay et al. | |
| 2015/0237268 A1 | 8/2015 | Vaiaoga et al. | |
| 2016/0019298 A1 | 1/2016 | Brodie et al. | |
| 2016/0055488 A1 | 2/2016 | Bims | |
| 2016/0294894 A1 | 10/2016 | Miller | |
| 2017/0205964 A1 | 7/2017 | Rivero | |
| 2018/0160055 A1 | 6/2018 | Taine et al. | |
| 2018/0191962 A1 | 7/2018 | Javier et al. | |

OTHER PUBLICATIONS

Non-Final Office Action dated May 11, 2021 for U.S. Appl. No. 16/853,353, filed Apr. 20, 2020, 26 Pages.

Notice of Allowance dated Aug. 8, 2019 for U.S. Appl. No. 15/395,755, filed Dec. 30, 2016, 15 Pages.

Notice of Allowance dated Jan. 22, 2021 for U.S. Appl. No. 16/716,344, filed Dec. 16, 2019, 15 Pages.

Office Action dated Oct. 5, 2020 for U.S. Appl. No. 16/716,344, filed Dec. 16, 2019, 26 Pages.

Office Action dated Jan. 15, 2019 for U.S. Appl. No. 15/395,755, filed Dec. 30, 2016, 14 Pages.

Office Action dated Aug. 28, 2018 for U.S. Appl. No. 15/395,755, filed Dec. 30, 2016, 20 Pages.

Office Action dated Apr. 29, 2019 for U.S. Appl. No. 15/395,755, filed Dec. 30, 2016, 15 Pages.

* cited by examiner

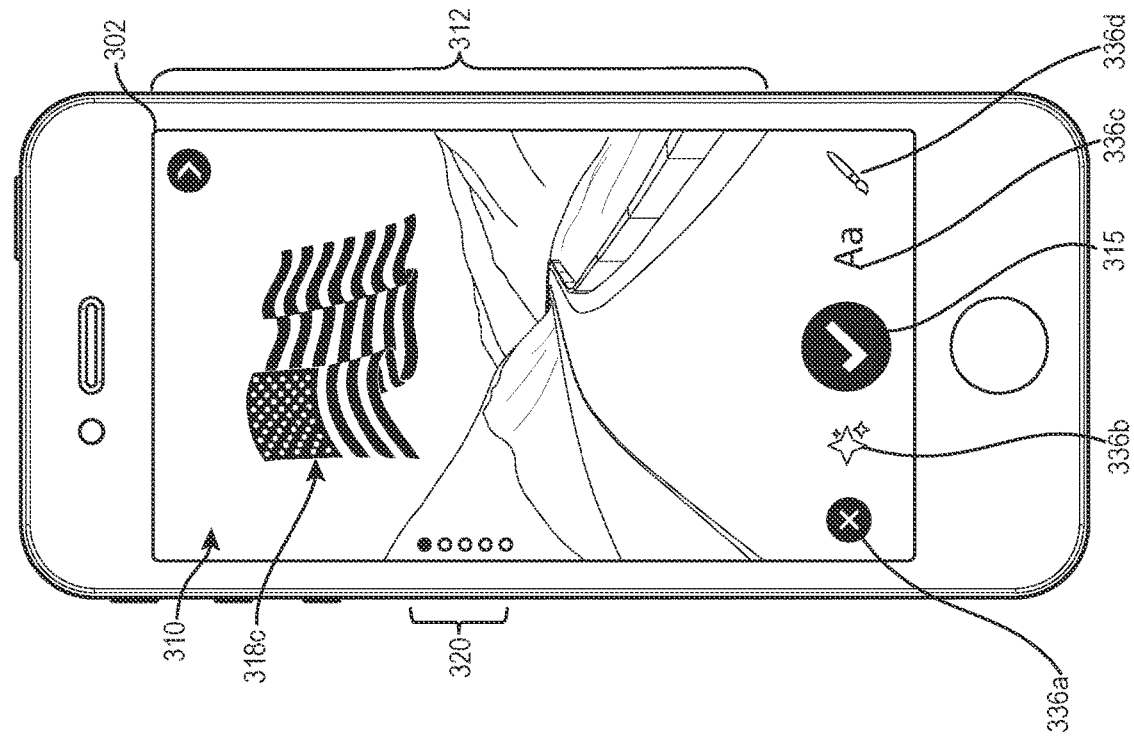
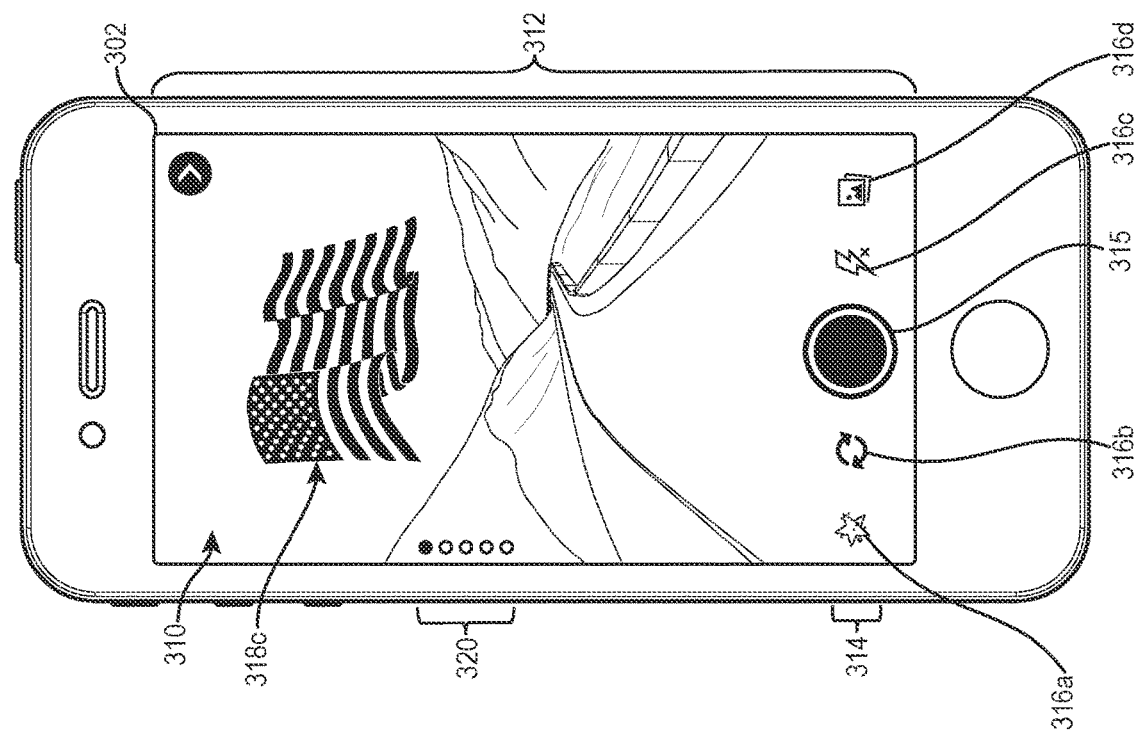
FIG. 3E
FIG. 3D

DYNAMICALLY RANKING MEDIA EFFECTS BASED ON USER AND DEVICE CHARACTERISTICS

CROSS-REFERENCE TO RELATED APPLICATIONS

The present application is a continuation of U.S. application Ser. No. 16/853,324 filed on Apr. 20, 2020, which is a continuation of U.S. application Ser. No. 16/716,344 filed on Dec. 16, 2019 which issued as U.S. Pat. No. 11,017,012, which is a continuation of U.S. application Ser. No. 15/395,755, filed on Dec. 30, 2016 which issued as U.S. Pat. No. 10,515,108. The aforementioned application is hereby incorporated by reference in its entirety.

BACKGROUND

Media communication (or communications including images or videos) is an increasingly popular method for users to engage each other. For example, where a user might have in the past composed a text communication share news, the user may now post a digital video/image sharing the good news. Media communications have become a preferred means of communication because digital videos, photographs, and the like generally take less time to create than a written message. Similarly, media communications are capable of effectively communicating more than a typical written message.

As media communications have gained popularity, so too have media effects. Media effects are special digital effects that a user applies to a media communication in order to make the communication more interesting, fun, and/or engaging. For example, if a user is creating a digital video to discuss a recent victory of a favorite sporting team, the user may apply a frame including the sporting team's name and colors around the video display. Other media effects can change displayed colors, add text, alter the appearance of people or articles, add additional graphics or animations, and so forth.

Creating media communications with media effects is now so commonplace that there are an ever-increasing number of media effects available to users. This increasing number of media effects, however, is problematic in many ways. For example, the number of media effects that a user generally has to select from is often overwhelming. As such, users typically choose one of only a few previously used media effects, rather than spending the time needed to search through large selections of available media effects.

In order to address the unwieldy nature of large collections of media effects, some conventional systems provide the user with a subset of the collection of media effects. For example, such conventional systems limit the number of media effects available to all users to a predetermined subset that the system periodically rotates. Thus, such conventional systems may provide a first subset of media effects for a week or month and then change the available media effects to a second subset for the next week or month. While providing a universal set of filtered/default media effects to all users/devices helps reduce the problem of searching through a large collection of media effects, it also limits a user's ability to access large numbers of the media effects that may be suitable or desirable for a given communication.

Other conventional systems provide a list of default media effects to all users. If users desire access to additional media effects the users must purchase, download, or unlock the additional media effects. While limiting media effects to a list of default media effects helps reduce the problem of searching through a large collection of media effects, it has other negative drawbacks. In particular, many users often never purchase, download, or unlock the additional media effects due to not knowing this is an option or not having the technical ability, time, or money to access the additional media effects. Thus, the use of a list of default media effects effectively prevents many users from ever accessing or using media effects that may be suitable or desirable for a given communication. Other users may desire and know how to purchase, download, or unlock additional media effects but may again be faced with the difficulty of having to search through large numbers of additional features to find or discover the media effects they wish to make available.

Furthermore, users are often interested in creating media communications as quickly as possible. Thus, most users simply do not have the time to scroll through libraries of media effects in order to find a media effect that is on-point with their media communication. Similarly, users may not have the time to purchase, download, or unlock additional media effects. Accordingly, most users either revert to using a default but less desirable media effect, which may not add much to the media communication, or they simply skip adding a media effect all together.

SUMMARY

One or more embodiments described herein provide benefits and/or solve one or more of the foregoing or other problems in the art with systems and methods for dynamically and intelligently ranking media effects. For example, in one or more embodiments, the systems and methods described herein identify media effects that will likely be selected by a user and applied to a media communication based on a variety of characteristics. Thus, in at least one embodiment, the systems and methods analyze characteristics associated with a user in order to identify media effects that are compatible with type of media communication the user is creating.

Additionally, one or more embodiments described herein further rank the identified media effects. For example, in response to an analysis of a variety of characteristics, the systems and methods described herein rank identified media effects in order to create a list of media effects that are specifically tailored to the user/device. Thus, one or more embodiments described herein present a subset of ranked media effects to the user in a graphical user interface in combination with the user's media communication. Systems and methods described herein rank the identified media effects based on various factors that signal how likely the user is to select and apply a particular media effect to a given media communication.

Additional features and advantages of the present application will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features can be obtained, a more particular description of the aspects of one or more embodiments briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of scope, one or more embodiments will be described and explained with additional specificity and detail through the use of the accompanying drawings in which:

FIGS. 3A-3F illustrate a series of graphical user interfaces of the media effect system in accordance with one or more embodiments illustrating various features of the media effect system;

DETAILED DESCRIPTION

Figure 1:
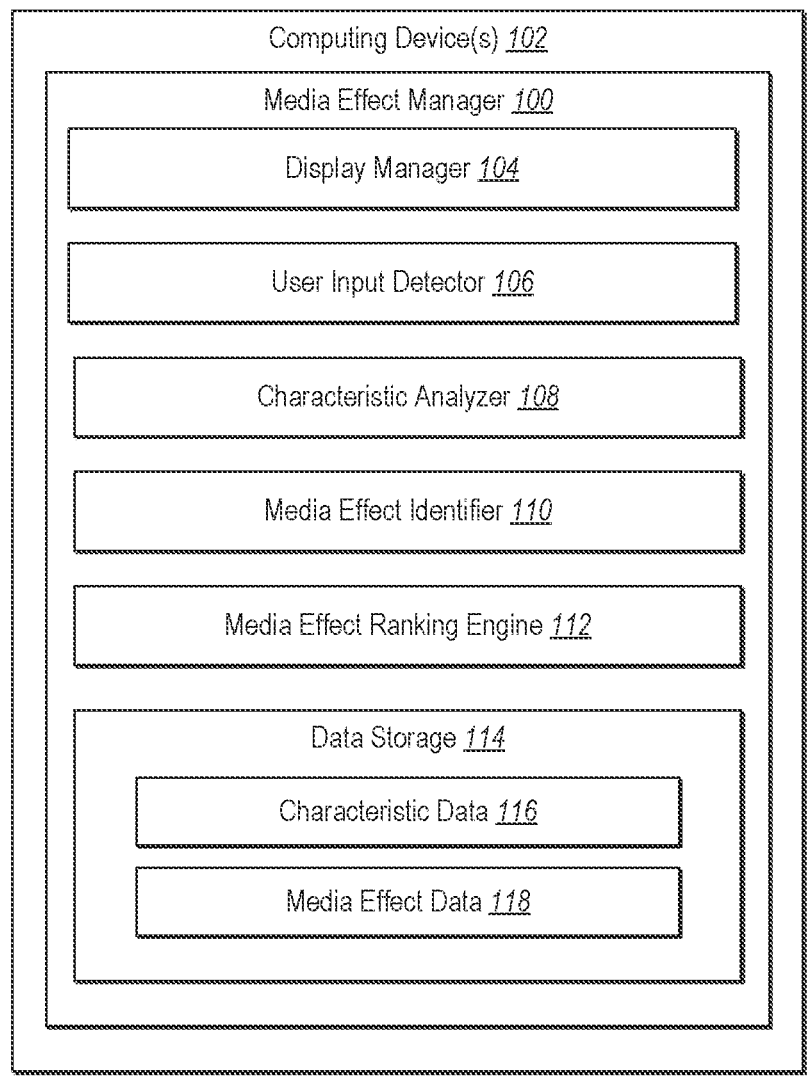
FIG. 1 illustrates a detailed schematic diagram of a media effect system in accordance with one or more embodiments.

In one or more embodiments, a media effect system compiles a ranked listing of media effects that is tailored to a particular user and the user's client-computing device (e.g., the user's smartphone). In one or more embodiments, the media effect system identifies and ranks media effects based on various characteristics associated with the user and the user's client-computing device. In this way, the media effect system presents the user with a customized subset of available media effects that the user is likely to select and apply to a media communication.

To illustrate the various example features and functionalities of the media effect system, an example embodiment can include a user initializing a communications client application on a client-computing device. In response to initializing the communications client application, the media effect system collects and analyzes characteristic information related to the client-computing device and the user of the client-computing device in order to later identify and rank media effects that will likely be of interest to the user of the client-computing device. For example, the media effect system collects client-computing device characteristics such as the geographic location of the client-computing device, the direction or orientation of a camera associated with the client-computing device, a frequency of use associated with the camera, a history of the user's interactions with the communications system application, content in the viewfinder of the client-computing device and so forth.

Additionally, in one or more embodiments, the media effect system also collects user characteristics associated with the user of the client-computing device. In at least one embodiment, the media effect system collects user characteristics by interfacing with a communications system (such as a social networking system) in order to collect the user's demographic information, the user's profile information, the user's communications system activity history, etc. The media effect system can limit the set of characteristics to only a few characteristics (e.g., the geographic location of the client-computing device, and the orientation of the client-computing device camera), or can collect a full and robust set of characteristics from data stored on the client-computing device and from data stored by the communications system.

After collecting characteristics associated with the client-computing device and the user of the client-computing device, the media effect system performs an analysis of the characteristics in order to identify one or more media effects that are tailored first to the client-computing device. In one or more embodiments, the media effect system analyzes the characteristics to determine categories of media effects that are compatible with the current characteristics of the client-computing device. For example, the media effect system performs a high-level analysis of client-computing device characteristics (e.g., camera orientation, camera mode, viewfinder content) to determine the types of media effects that are compatible with the client-computing device in its current state. For instance, the media effect system can analyze the client-computing device characteristics to determine whether the front-facing camera of the client-computing device is activated. If the media effect system determines that the front-facing camera is not activated, the media effect system will identify categories of media effects that operate in connection with photographs and video taken with a rear-facing camera.

The media effect system further narrows the identified categories of media effects based on additional characteristics. For example, the media effect system can narrow the identified categories of media effects based on the location of the client-computing device, the date and time at the location of the client-computing device, any major events occurring at the location and date and time of the client-computing device (e.g., parades, sporting events, conventions, etc.), and so forth. In one or more embodiments, the media effect system can narrow the identified categories of media effects based not only on client-computing device and user characteristics, but also on communications system information, web searches, email searches, calendar searches, and so forth. At this point, the media effect system has a large collection of media effects in various categories that likely apply to the current set of characteristics associated with client-computing device and with the user of the client-computing device.

In order to present a manageable listing of media effects in which the user will most likely be interested, in one or more embodiments, the media effect system next ranks the identified media effects based on one or more user characteristics. For example, the media effect system interfaces with a communications system in order to collect user characteristics such as the user's demographic information, the user's profile information, the user's communications system activity history, etc. The media effect system can use these user characteristics to determine how frequently the user applies media effects to media communications, how frequently the user posts media communications, the type of media effects the user has utilized in the past, the frequency with which the user's communications system co-users (e.g., "friends") utilize media effects, the user's gender and age, and so forth. Accordingly, the media effect system can use these characteristics specific to the user to rank the identified media effect such that the highest ranked media effects are those in which the user will most likely be interested.

More particularly, in one or more embodiments, the media effect system determines scores for each of the media effects based on the identified characteristics (i.e., device and/or user characteristics). The media effects system then identifies media effects with scores above a predetermined threshold score. The media effects system then surfaces/provides the media effects with scores above the predetermined threshold score to the user on the client computing device. For example, the media effect system provides a subset of the ranked listing of media effects to the user of the client-computing device in a graphical user interface. For example, in at least one embodiment, the media effect system applies the top-ranked media effect to the viewfinder display of a media application as soon as the user opens the application. Then the user can swipe through the subset of ranked media effects in order to see a preview of each provided media effect applied to the camera viewfinder display.

Thus, the media effects system dynamically and intelligently determines a number of media effects customized or tailored to a user and the characteristics associated with the user's given situation and surfaces the determined media effects to the user. Accordingly, the media effects system changes or customizes both the particular media effects and the number of media effects each time a user accesses the communications system application associated with the media effects system.

The media effect system saves the user time and energy by providing a limited selection of media effects that are tailored specifically to the user and the user's client-computing device. Thus, one or more embodiments intelligently and dynamically filter media effects to feature a limited number of media effects, thereby reducing the need to search through large numbers media effects. Furthermore, the media effect system provides such benefits while allowing media effects from the entire library of media effects to be included in the featured set of media effects. Thus, rather than providing a universal set of filtered/default media effects to all users/devices, the media effect system intelligently and dynamically customizes a limited set of featured media effects while providing the flexibility of including any media effect in the set of featured media effects.

In at least one embodiment, the media effect system is included as part of the functionality of a communications client application, such that the user can apply one or more of the media effects to a media communication, and send the media communication to the communications system in just a few taps. Thus, the media effect system allows a user to quickly and easily choose a media effect from a limited number of featured media effects that include the most likely or pertinent media effects from a large library of media effects.

Also as used herein, a "media effect" refers to a modification technique applied to an item of digital media (e.g., digital image or video). For example, media effects can include one or more media formats (i.e., types or categories of modification technique) applied to an item of digital media. Examples of media formats include filters, masks, overlays, animations, graphics, frames, and so forth. Thus, a media effect can include one or more instances of media formats (i.e., a particular filter or mask).

FIG. 1 illustrates a schematic diagram illustrating an example embodiment of the architecture of the media effect system 100. As shown in FIG. 1, the media effect system 100 includes various components for performing the processes and features described herein. For example, as shown in FIG. 1, the media effect system 100 includes, but is not limited to, a display manager 104, a user input detector 106, a characteristic analyzer 108, a media effect identifier 110, a media effect ranking engine 112, and a data storage 114 including characteristic data 116 and media effect data 118. In one or more embodiments, the media effect system 100 is implemented by one or more computing device(s) 102. For example, the media effect is installed on a client-computing device. Alternatively, the media effect system 100 is installed on a server device hosting a communications system. In at least one embodiment, the features and functionality of the media effect system 100 are performed by a combination of one or more client-computing devices and servers.

In one or more embodiments, the media effect system 100 handles activities related to providing media effects to a user of a client-computing device. For example, the media effect system 100 analyzes characteristics, identifies media effects, ranks media effects, and presents media effects via one or more graphical user interfaces. In at least one embodiment, the media effect system 100 includes a repository of media effects (e.g., media effect data 118). Alternatively, in other embodiments, the media effect system 100 may query a remote server or database storing the repository of media effects.

In one or more embodiments, each media effect within the repository utilized by the media effect system 100 is associated with metadata that describes attributes of the media effect. For example, a media effect that causes a cartoon character mask to be displayed over a person's face may be associated with metadata that specifies that the media effect type or format is "mask," that the media effect is compatible with a "selfie" (e.g., a self-portrait) or a portrait of a single person, that the media effect functions with digital photographs or videos captured by either a front-facing camera or a rear-facing camera, that the media effect is compatible with a wide range of lighting environments, that the media effect is gender-neutral, that the media effect is location-neutral, and so forth. Accordingly, as will be described in greater detail below, the media effect system 100 utilizes this metadata when identifying and ranking each media effect. In at least one embodiment, the creator of a media effect generates the metadata associated with the media effect. Alternatively, in some embodiments, the media effect system 100 analyzes each media effect to generate the metadata associated with each media effect.

As shown in FIG. 1, the media effect system 100 includes the display manager 104. In one or more embodiments, the display manager 104 generates, provides, manages, and/or controls one or more graphical user interfaces that allow a user to interact with features of the media effect system 100. For example, the display manager 104 generates a graphical user interface ("GUI") that includes a camera viewfinder display along with other selectable controls. In at least one embodiment, the display manager 104 further overlays one or more media effects on the camera viewfinder display in order to provide a preview of how the media effect looks in combination with the camera viewfinder display. The display manager 104 can additionally generate other GUIs that assist a user in creating a multimedia communication and sending the multimedia communication to a social networking system.

More specifically, the display manager 104 facilitates the display of a graphical user interface. For example, the display manager 104 may compose the graphical user interface of a plurality of graphical components, objects, and/or elements that allow a user to engage with features of the media effect system 100. More particularly, the display manager 104 may direct a client-computing device to display a group of graphical components, objects, and/or elements that enable a user to interact with various features of the media effect system 100.

In addition, the display manager 104 directs a client-computing device to display one or more graphical objects, controls, or elements that facilitate user input for interacting with various features of the media effect system 100. To illustrate, the display manager 104 provides a graphical user interface that allows a user to edit multimedia. The display manager 104 also facilitates the input of text or other data for the purpose of interacting with one or more features of the media effect system 100. For example, the display manager 104 provides a GUI that functions in connection with a touch screen. A user can interact with the touch screen using one or more touch gestures to preview media effects, input text, manipulate displays, and so forth.

Furthermore, the display manager 104 is capable of transitioning between two or more GUIs. For example, in one embodiment, the display manager 104 provides a camera viewfinder display. Later, in response to detected input from the user, the display manager 104 transitions to a second GUI that includes a listing of media effects.

As further illustrated in FIG. 1, the media effect system 100 includes the user input detector 106. In one or more embodiments, the user input detector 106 detects, receives, and/or facilitates user input. In some examples, the user input detector 106 detects one or more user interactions with respect to a user interface or GUI. As referred to herein, a "user interaction" means a single interaction, or combination of interactions, received from a user by way of one or more input devices. For example, the user input detector 106 detects a user interaction from a keyboard, mouse, touch page, touch screen, and/or any other input device. In the event the client-computing device includes a touch screen, the user input detector 106 detects one or more touch gestures (e.g., swipe gestures, tap gestures, pinch gestures, reverse pinch gestures) from a user that forms a user interaction. In some examples, a user can provide the touch gestures in relation to and/or directed at one or more graphical objects or graphical elements of a user interface or GUI.

The user input detector 106 may additionally, or alternatively, receive data representative of a user interaction. For example, the user input detector 106 may receive one or more user configurable parameters from a user, one or more commands from the user, and/or other suitable user input. The user input detector 106 may receive input data from one or more components of the media effect system 100 or from one or more remote locations.

The media effect system 100 performs one or more functions in response to the user input detector 106 detecting user input and/or receiving other data. Generally, a user can control, navigate within, and otherwise use the media effect system 100 by providing one or more user inputs that the user input detector 106 can detect. For example, in response to the user input detector 106 detecting user input, one or more components of the media effect system 100 enable a user to swipe through a listing of top-ranked media effects.

As further illustrated in FIG. 1, the media effect system 100 includes the characteristic analyzer 108. As mentioned above, the media effect system 100 identifies and ranks media effects based on various characteristics associated with a client-computing device and a user of the client-computing device. Accordingly, the characteristic analyzer 108 collects and analyzes information associated with client-computing device characteristics and user characteristics.

In one or more embodiments, the characteristic analyzer 108 collects information associated with client-computing device characteristics. For example, in at least one embodiment, the characteristic analyzer 108 collects information including, but not limited to, global positioning satellite data ("GPS") associated with the client-computing device, gyroscopic information associated with the client-computing device, camera data associated with the client-computing device, date and time data associated with the client-computing device, and application usage data associated with the client-computing device.

After collecting information associated with various client-computing device characteristics, the characteristic analyzer 108 performs an analysis on the collected information in order to determine characteristics of the client-computing device. For example, the characteristic analyzer 108 analyzes GPS data associated with the client-computing device in order to determine the location of the client-computing device. In another example, the characteristic analyzer 108 analyzes camera data associated with the client-computing device to determine the orientation of the camera (e.g., front-facing or rear-facing), the subject matter at which the camera is pointed (e.g., a "selfie," a landscape, an animal, a group of people, a beach, and so forth), the lighting at the location where the camera is (e.g., low lighting, bright lighting, indoor lighting, outdoor lighting, etc.), and so forth. In yet another example, the characteristic analyzer 108 analyzes application usage data associated with the client-computing device in order to determine how often the user of the client-computing device utilizes the camera, saves pictures, uploads pictures to social networking systems, shares pictures via SMS and/or email, etc. In one or more embodiments, the characteristic analyzer 108 determines client-computing device characteristics by utilizing machine learning, neural networks, Internet searches, computer vision, and so forth to analyze client-computing information.

As mentioned above, the characteristic analyzer 108 also collects and analyzes user characteristic information. In at least one embodiment, the characteristic analyzer 108 collects user characteristic information by interfacing with a communications system. For example, in one or more embodiments, when the user maintains an account with the communications system, the communications system includes user characteristic information such as, but not limited to, the user's demographic information (e.g., the user's gender, age, occupation, residency, education, income, interests, relationship status, etc.), the user's communications system activity history (e.g., the user's media uploads, posts, messages, likes, shares, comments, etc.), the communications system activity history of the user's "friends," the communications system activity history of users located near the user, and so forth. In one or more embodiments, the communications system comprises a social networking system. Additionally, the characteristic analyzer 108 can also collect user information from one or more of a personal calendar stored on the client-computing device, one or more emails stored on the client-computing device, one or more SMS text messages stored on the client-computing device, web browser history or other web browser files stored on the client-computing device, and so forth.

After collecting information associated with various user characteristics, the characteristic analyzer 108 performs an analysis on the collected information in order to determine characteristics of the user of the client-computing device. For example, the characteristic analyzer 108 analyzes the user's demographic information to determine one or more demographic classifications that apply to the user. In another example, the characteristic analyzer 108 analyzes the user's communications system activity history to determine how often the user utilizes media communications, how often the user applies one or more media effects to the media communications, and which types media effects the user applies most often. In yet another example, the characteristic analyzer 108 analyzes the social networking system activity history of the user's friends and other social networking system users to determine the frequency and types of media effects that are utilized by the user's friends and others.

As mentioned above, and as shown in FIG. 1, the media effect system 100 also includes the media effect identifier 110. In one or more embodiments, after the characteristic analyzer 108 determines one or more characteristics associated with the client-computing device and the user of the client-computing device, the media effect identifier 110 identifies media effects that meet a threshold level of compatibility with one or more characteristics of the client-computing device. For example, in at least one embodiment, the media effect identifier 110 begins with a high-level identification of classes or categories of media effects that are broadly compatible with one or more characteristics of the client-computing device. To illustrate, if the characteristics of the client-computing device include a front-facing camera orientation and a human face displayed in the viewfinder of the camera (e.g., indicating the user is trying to take a "selfie"), the media effect identifier 110 identifies media effects that can be applied to "selfie" shots. In other words, if the characteristics of the client-computing device indicate the user is taking a "selfie" shot, the media effect identifier 110 will remove from consideration media effects that cannot be applied to a that type of multimedia communication. In other words, the media effect identifier 110 will ignore media effects that apply to landscape shots, group shots, action shots, and so forth.

In one or more embodiments, the media effect identifier 110 continues to narrow the set of identified media effects based on additional characteristics of the client-computing device. For example, the media effect identifier 110 can remove from consideration media effects that are incompatible with the date and time associated with the client-computing device (e.g., the media effect identifier 110 will ignore holiday media effects if the date is in June), media effects that are incompatible with the location of the client-computing device (e.g., media effect identifier 110 will ignore media effects that are specific to New York City if the client-computing device is located in Los Angeles), media effects that are incompatible with current lighting conditions, and so forth. Thus, the media effect identifier 110 continues identifying media effects until the collection of identified media effects are only those that are compatible with the various characteristics of the client-computing device.

In at least one embodiment, the media effect identifier 110 can further narrow the set of identified media effects based on characteristics of the user of the client-computing device. For example, if a user characteristic indicates that the user is male, the media effect identifier 110 can remove from consideration media effects that are specific to females. In one or more embodiments, the media effect identifier 110 identifies and narrows the collection of media effects utilizing machine learning, neural networks, Internet searches, computer vision, and so forth.

At this point, the media effect system 100 has a collection of media effects that are compatible with at least one characteristic of the client-computing device, and also compatible with at least one characteristic of the user of the client-computing device. As illustrated in FIG. 1, the media effect system 100 includes the media effect ranking engine 112. In one or more embodiments, the media effect ranking engine 112 ranks identified media effects based on one or more characteristics of the user of the client computing device and identifies a subset of the media effects that have a score above a predetermined threshold score or a predetermined number of media effects with the highest scores. Thus, in at least one embodiment the media effect system 100 presents only the most relevant and likely to be useful media effects to the user, saving the user the time and hassle of trying to find one or more media effects manually.

To illustrate, the media effect ranking engine 112 ranks each media effect in the collection of identified media effects by calculating a score for each media effect that reflects a likelihood that the media effect will be selected by the user. In one or more embodiments, the media effect ranking engine 112 calculates a score for a particular media effect by adding a weighted amount to the media effect's score for each user characteristic with which the media effect is compatible.

The media effect ranking engine 112 calculates a score for a particular media effect by comparing the metadata associated with the media effect to the user characteristics. For example, in one embodiment, the characteristic analyzer 108 may have determined that a user's characteristics include that the user is a female, the user is 25 years old, the user is currently attending college, the user is single, that the user frequently posts "selfies" to the social networking system, that the user prefers media effects that add animated graphics to a digital photograph or video, and that the user's social networking system friends also frequently post "selfies" to the social networking system. Accordingly, the media effect ranking engine 112 will calculate a higher score for media effects that correlate with these identified characteristics.

In at least one embodiment, the media effect ranking engine 112 increases the score of the media effect in a manner that is directly proportional to the strength of a correlation between a portion of the metadata and at least one of the user characteristics. For example, if a portion of the metadata associated with a media effect indicates that the media effect is compatible with "selfies," and at least one user characteristic indicates that the user frequently posts "selfies" to the social networking system, the media effect ranking engine 112 will significantly increase the score for that media effect. If the user characteristics indicate that the user only posts "selfies" every once in a while, the media effect ranking engine 112 will only slightly increase the score for that media effect.

In one or more embodiments, the media effect ranking engine 112 may place additional weight on certain correlations between media effect metadata and one or more user characteristics. For example, in one embodiment, the media effect ranking engine 112 places additional weight on correlations that indicate that a media effect is of a certain type that the user frequently applies to digital photographs and videos. To illustrate, if a media effect is associated with a certain sports team (e.g., the media effect adds the team logo to a corner of a digital photograph) and user characteristics indicate the user frequently applies media effects associated with the sports team to digital photographs, the media effect ranking engine 112 will add extra weight to the identified correlation between the media effect type and the user characteristic. In one or more embodiments, the media effect ranking engine 112 adds extra weight to correlations associated with the user's history of media effect usage (e.g., the user frequently uses media effects or frequently uses a particular type of media effect), correlations between location-specific media effects and the user's location (e.g., the user located at a sporting event and a media effect is associated with that sporting event), correlations between media effect trends and the user's demographic information (e.g., a particular media effect is very popular among other users who are the same age as the user), and so forth.

In one or more embodiments, the media effect ranking engine 112 continues comparing the metadata associated with a media effect to the one or more user characteristics until the media effect ranking engine 112 has calculated a score for the media effect that reflects how likely the user is to select the media effect. In at least one embodiment, the media effect ranking engine 112 performs this same process for each media effect identified by the media effect identifier 110, as described above. Alternatively, the media effect ranking engine 112 may only perform the calculation for the first threshold number of media effects identified by the media effect identifier 110 (e.g., the first 30 media effects, the first 100 media effects, etc.).

In one or more embodiments, the media effect ranking engine 112 includes various override mechanisms. For example, in one embodiment, the media effect ranking engine 112 may include "hard rules" that are taken into account when calculating a score for a media effect (e.g., a media effect including explicit content always receives a score of zero). In another embodiment, the media effect ranking engine 112 can include an override setting for promoted content. For example, if an advertiser pays to have a specific media effect promoted across users of the media effect system 100, the media effect ranking engine 112 will place very heavy weights on the correlations between a particular set of characteristics and the specific media effect, thereby forcing a higher score and increasing the likelihood that the specific media effect will be presented more frequently to users.

Furthermore, in at least one embodiment, the media effect ranking engine 112 combines top-ranking media effects that are compatible with each other. For example, a first top-ranking media effect may add an animation to a digital photograph and a second top-ranking media effect may add a frame around a digital photograph. In at least one embodiment, the media effect ranking engine 112 utilizes machine learning and other techniques to analyze the metadata associated with each media effect to determine that the two top-ranking media effects are compatible (e.g., because they would not overlap when overlaid on the same photograph, because the colors within each media effect are complimentary, etc.). In response to this determination, the media effect ranking engine 112 can combine the two media effects into a single media effect. In such cases, the media effect ranking engine 112 increase or augments the score for the combined media effect based on a total number of attributes correlating to the characteristics of the user or computing device may be higher based on the fact that the combined media effect has the attributes of both of the individual media effects combined.

Once the media effect ranking engine 112 has calculated a score for each identified media effect, the media effect ranking engine 112 then identifies a subset of media effects to present or surface to the user based on the determined scores. As mentioned above, in at least one embodiment, the media effect system 100 presents a dynamic number of top-ranked media effects to the user of the client-computing device. This approach saves the user time and hassle, and also increases the likelihood that the user will apply one of the presented media effects to his or her media communication.

For example, the media effect system 100 can present the media effects that each have a calculated score that is above a predetermined threshold score. For example, if the media effect ranking engine 112 calculates scores for media effects between zero and one-hundred, the media effect ranking engine 112 may only present those media effects with calculated scores above ninety. As mentioned, the use of a predetermined threshold score means that the media effect ranking engine 112 will dynamically identify a different number of and different specific media effects based on the identified characteristics. When one or more of the characteristics of the user or the client computing device change, the media effect ranking engine 112 can dynamically update the scores for the media effects. Updating the scores, can cause the media effect ranking engine 112 to identify a different number of media effects that are above the predetermined threshold score and different specific media effects that are above the predetermined threshold score.

Thus, in one or more embodiments the number of media effects that the media effect ranking engine 112 presents to the user changes depending on the characteristics associated with the user and the client-computing device. To illustrate, if the client-computing device characteristics indicate the front-facing camera is activated and the user characteristics indicate that the user frequently posts "selfies," the media effect ranking engine 112 may identify 10 media effects that are above the predetermined threshold score. Conversely, if the client-computing device characteristics indicate that the rear-facing camera is activated and the user characteristics indicate that the user rarely applies media effects to digital photographs taken with the rear-facing camera, the media effect ranking engine 112 may identify only 3 media effects that are above the predetermined threshold score. Accordingly, in most embodiments, the number of ranked media effects that the media effect ranking engine 112 presents is variable or dynamic, even for the same user interacting with the same client-computing device.

In at least one embodiment, rather than identifying media effects that have scores above a predetermined threshold score, as described above, the media effect ranking engine 112 identifies a predetermined number of effects. For example, the media effect ranking engine 112 can identify the top 10 media effects (i.e., the media effects with the top 10 scores).

As shown in FIG. 1, and as mentioned above, the media effect system 100 also includes the data storage 114. The data storage 114 includes characteristic data 116 and media effect data 118. In one or more embodiments, the characteristic data 116 includes characteristic information, such as described herein (e.g., client-computing device characteristic information, and user characteristic information). Also in one or more embodiments, the media effect data 118 includes media effect information, such as described herein (e.g., media effect metadata, identified media effect information, media effect ranking information, media effect attributes).

Figure 2:
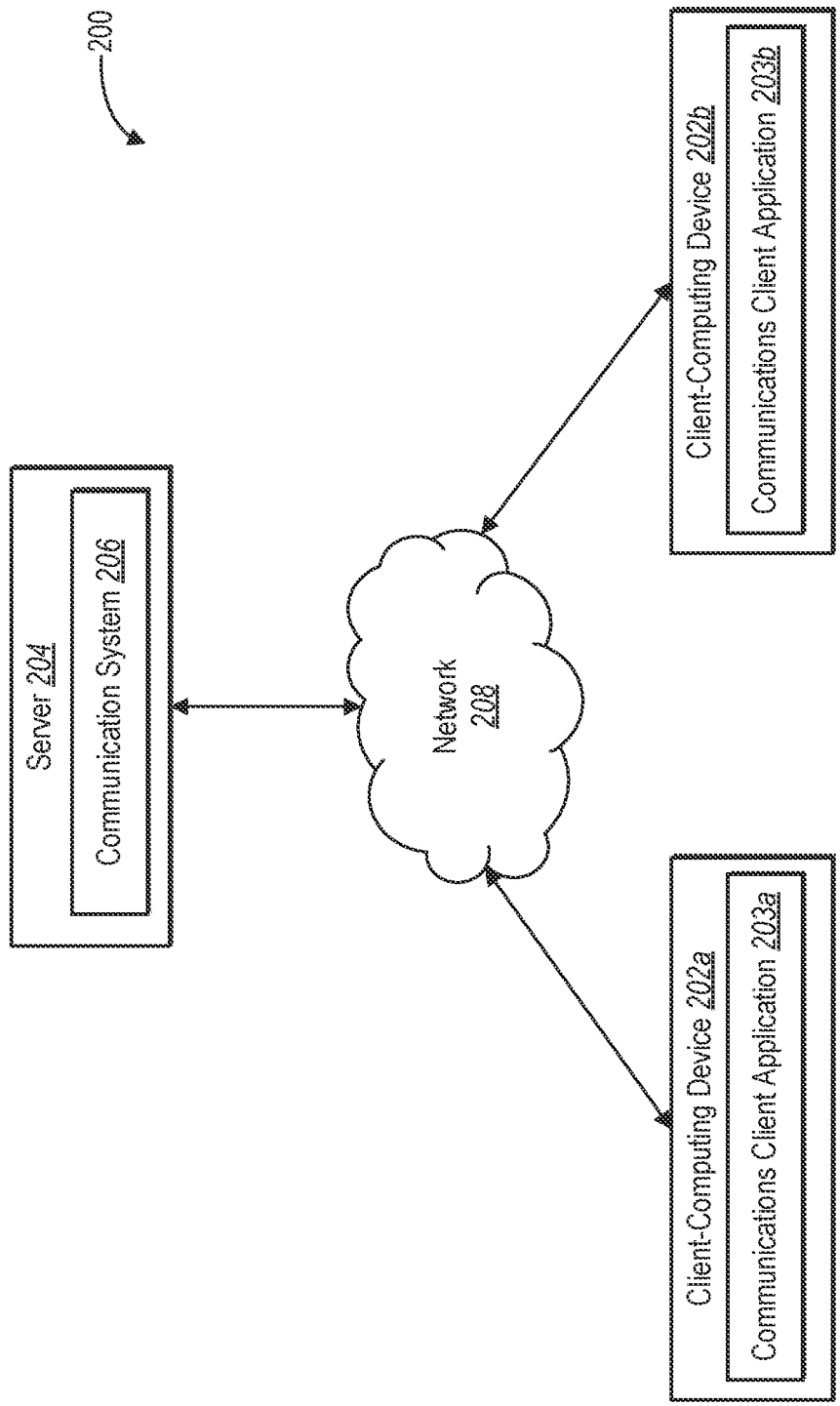
FIG. 2 illustrates an exemplary environment in which the media effect system in accordance with one or more embodiments.

FIG. 2 illustrates an example block diagram of an environment 200 for implementing the media effect system 100. As illustrated in FIG. 2, the environment 200 includes client-computing devices 202a, 202b that implement communications client applications 203a, 203b. Further shown in FIG. 2, the environment 200 also includes a server 204 hosting a communications system 206 (such as a social networking system as described below in relation to FIGS. 6 and 7.

The client-computing devices 202a, 202b and the server 204 communicate via a network 208, which may include one or more networks and may use one or more communication platforms or technologies suitable for transmitting data and/or communication signals. In one or more embodiments, the network 208 includes the Internet or World Wide Web. The network 208, however, can include various other types of networks that use various communication technologies and protocols, such as a corporate intranet, a virtual private network ("VPN"), a local area network ("LAN"), a wireless local network ("WLAN"), a cellular network, a wide area network ("WAN"), a metropolitan area network ("MAN"), or a combination of two or more such networks. Additional details relating to the network 208 are explained below with reference to FIG. 6.

Although FIG. 2 illustrates a particular number and arrangement of client-computing devices, in additional embodiments that client-computing device 202a, 202b may directly communicate with the communications system 206, bypassing the network 208. Further, in other embodiments, the environment 200 may include any number of client-computing devices. Additional details with respect to the computing devices 202a, 202b, 204 (which can comprise examples of the computing device 102) are discussed below with respect to FIG. 5.

In one or more embodiments, the client-computing devices 202a, 202b can be one of various types of computing devices. For example, each of the client-computing devices 202a, 202b may include a mobile device such as a mobile telephone, a smartphone, a PDA, a tablet, or a laptop. Additionally, or alternatively, the client-computing devices 202a, 202b may include a non-mobile device such as a desktop computer, a server, or another type of computing device. It will be understood that a both client-computing devices 202a, 202b can include the same type of computing functionality. In other words, in a preferred embodiment, both the client-computing device 202a and the client-computing device 202b are mobile computing devices, such as smartphones. In at least one embodiment, the user of the client-computing device 202a and the user of the client-computing device 202b are associated (e.g., "friends") via the communications system 206.

In one or more embodiments, each of the client-computing devices 202a, 202b include a communications client application 203a, 203b associated with the communications system 206. For example, the communications client application 203a, 203b enables the users of the client-computing devices 202a, 202b to view and interact with communications system content, and to submit media communications, posts, and other content to other users via the communications system 206. In at least one embodiment, media communications and other content submitted to the communications system 206 from the client-computing device 202a can be viewed and interacted with at the client-computing device 202b, and vice versa.

As shown in FIG. 2, and as mentioned above, the server 204 hosts the communications system 206. In one or more embodiments, the communications system 206 provides posts, electronic message, structured objects, and live video streams to one or more co-users (e.g., by way of a profile, a newsfeed, a communication thread, a timeline/wall, a live video stream display, or any other type of graphical user interface presented via the communications client application on the client-computing devices 202a, 202b). For example, one or more embodiments provide a user with a social networking system newsfeed containing posts from one or more co-users associated with the user (e.g., the user's "friends"). In one or more embodiments, a post can include one or more media communications (e.g., edited or unedited digital photographs and digital videos), such as described above.

In one or more embodiments, a system user scrolls through his or her social networking system newsfeed in order to view recent social networking system posts submitted by the one or more co-users associated with the user via the communications system 206. In one embodiment, the communications system 206 organizes the social networking system posts chronologically in a user's social networking system newsfeed or timeline/wall. In alternative embodiments, the communications system 206 organizes the social networking system posts geographically, by interest groups, according to a relationship coefficient between the user and the co-user, etc. Additionally, in one or more embodiments, the user can download a copy of the social networking system newsfeed as a record of the social networking system posts displayed thereon.

The communications system 206 also enables the user to engage in all other types of communications system activity. For example, the communications system 206 enables a social networking system user to scroll through newsfeeds, click on posts and hyperlinks, compose and submit electronic messages and posts, interact with structured object, watch live video streams, interact with media communications, and so forth.

In one or more embodiments, the media effect system 100, described with reference to FIG. 1, may be implemented by the communications system 206, the server 204, or any of the client-computing devices 202a, 202b. For example, in one embodiment, the communications system 206 includes the media effect system 100. In that embodiment, the communications client applications 203a, 203b enable the client-computing devices 202a, 202b to interface with the media effect system 100 remotely across the network 208. In another embodiment, the communications client applications 203a, 203b both include the media effect system 100. In that embodiments, the communications client applications 203a, 203b may communicate with the communications system 206 and/or the server 204 (or other servers) in order to receive user characteristic information, media effect information, and so forth.

As will be described in more detail below, the components of the media effect system 100 can provide, along and/or in combination with the other components, one or more graphical user interfaces ("GUIs"). In particular, the communications client applications 203a, 203b on the client-computing devices 202a, 202b can display one or more GUIs generated by the media effect system 100, described above. The communications client applications 203a, 203b enable the user of the client-computing device 202a and/or the user of the client-computing device 202b to interact with a collection of display elements within one or more GUIs for a variety of purposes. FIGS. 3A-3F and the description that follows illustrate various example embodiments of the GUIs that are used to describe the various features of the media effect system 100.

Figure 3A:
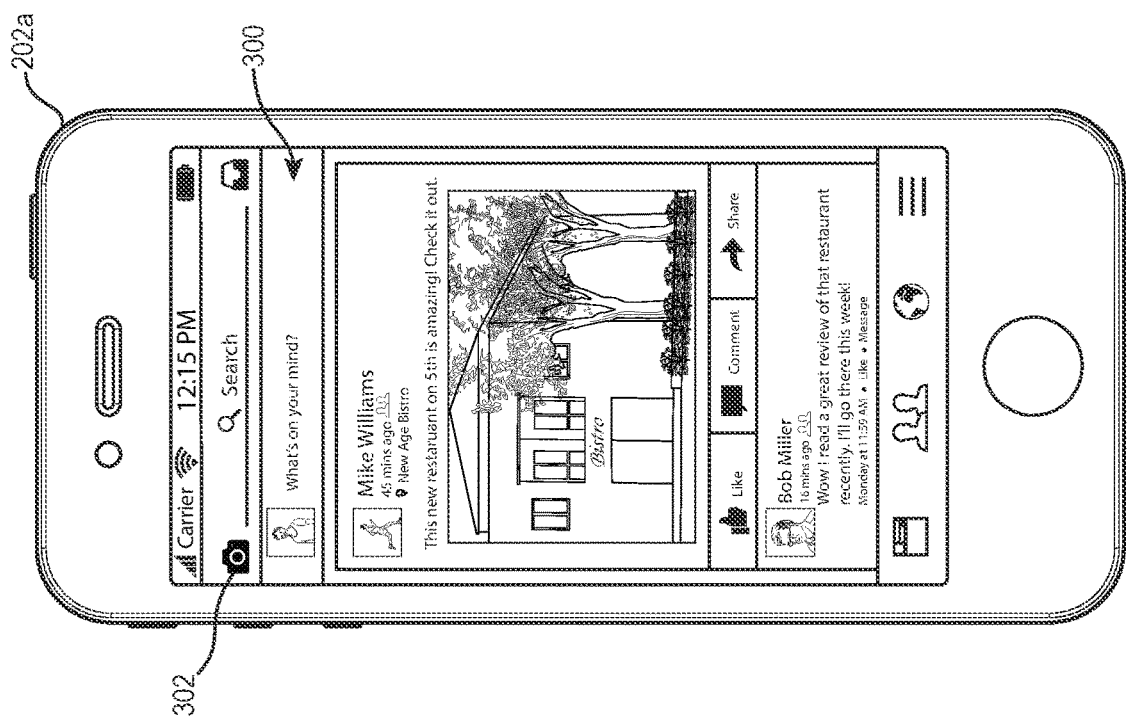

For example, as mentioned above, the media effect system 100 provides various features and functionality to the user in response to the user initializing an application in order to create a media communication. FIG. 3A illustrates a user interface 300 of the communications client application 203a provided via the client computing device 202a. The user interface 300 includes a camera icon 302. Upon selection of the camera icon 302, the media effect system 100 begins the process of identifying and ranking media effects, as described above. It will be understood that while the media effect system 100 is described herein as performing the identification and ranking of media effects in response to the detected selection of a camera icon 302, in additional embodiments, the media effect system 100 may determine characteristics, identify and rank media effects, etc. at any time as a background process.

In the illustrative embodiment, in response to a detected selection of the camera icon 302, the media effect system 100 collects and analyzes characteristic information associated with the client-computing device 202a (e.g., camera orientation, gyroscope orientation, GPS location, time and date, application usage history, etc.) and characteristic information associated with the user (or an account of the user) of the client-computing device 202a (e.g., demographic information, social networking system activity information, social networking system activity information of co-users, etc.). Next, the media effect system 100 identifies a collection of media effects that are compatible with one or more of the client-computing device characteristics. Finally, the media effect system 100 ranks the identified media effects, as described above with reference to FIG. 1.

Figure 3C:
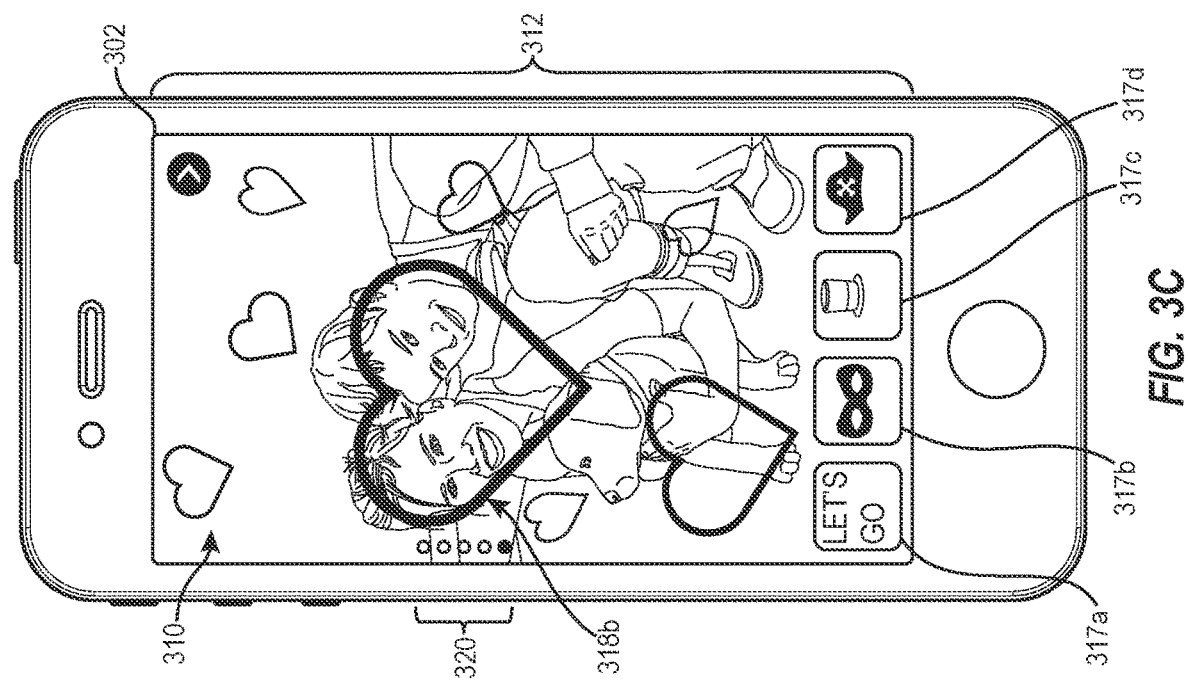
Figure 3B:
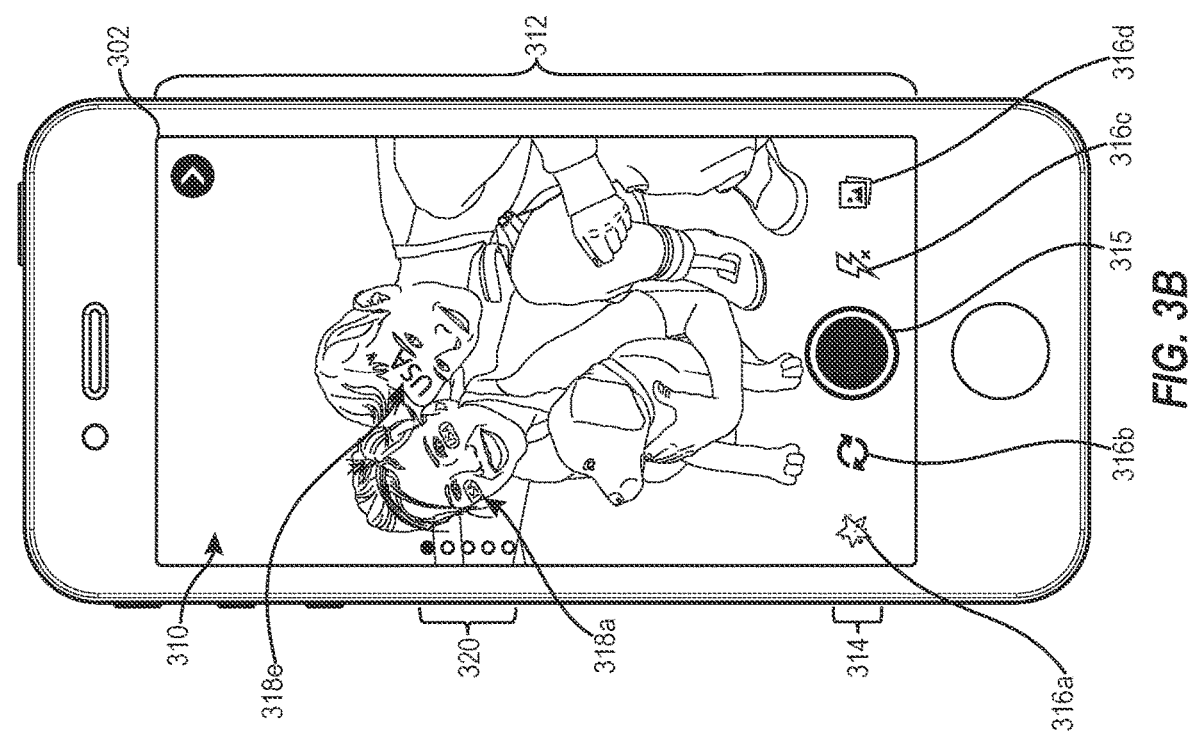

Thus, in one or more embodiments, immediately upon opening a viewfinder associated with the camera icon 302, the media effect system 100 presents the top-ranked media effects to the user of the client device 202a over a live feed from camera or a recently captured image from the camera. For example, as shown in FIG. 3B, the application presents a media communication GUI 310 on the touch screen display 302 of the client-computing device 202a wherein the user can create and edit a media communication. In one or more embodiments, the media communication GUI 310 includes a camera viewfinder display 312 and a toolbar 314 with a shutter button 315 and various controls 316a, 316b, 316c, and 316d.

As shown in FIG. 3B, as soon as the application presents camera viewfinder display 312, the media effect system 100 applies (without further user input other than selecting an option to open the camera viewfinder) the top-ranked media effect 318a to the camera viewfinder display 312. In one or more embodiments, the camera viewfinder display 312 includes a display of what a camera associated with the client-computing device 202a is currently viewing. Thus, as illustrated in FIG. 3B, either a front-facing camera of the client-computing device 202a is currently viewing the user of the client-computing device 202a (e.g., a "selfie"), or a rear-facing camera of the client-computing device 202a is currently viewing another person standing in front of the user of the client-computing device 202a. In alternative embodiments, the user can capture an image using the capture control 316 and the media effect system 100 applies the top-ranked media effect 318a to the captured image.

In still further embodiments, the user can navigate to previously stored images using camera roll control 316d. For example, in response to a selection of the camera roll control 316d, the media effect system 100 can present a camera roll along the bottom of the camera viewfinder display 312 including the most recent images captured on the client-computing device 202a. In at least one embodiment, the media effect system 100 can automatically apply various media effects to the images displayed in the camera roll. For example, if the camera roll includes additional images taken within a threshold amount of time from the current time or at the same location where the client-computing device 202a is currently located, the media effect system 100 can apply the same media effect elements 318a and 318e to the camera roll images.

Additionally or alternatively, the media effect system 100 can apply different media effects to images in the camera roll from the media effects applied to the camera viewfinder display 312. For example, as described above, the media effect system 100 may apply masks, textual overlays, and so forth to the camera viewfinder display 312. In one or more embodiments, the media effect system 100 may apply different media effects to images in a camera roll than those applied to the camera viewfinder display 312 such as media effects that change the color pallet of an image, media effects that change the lighting of an image, media effects that convert an image to black and white, etc.

Referring again to FIG. 3B and as described above, the media effect system 100 determines the characteristics associated with the client-computing device 202a (e.g., the camera orientation, the subject at which the camera is directed, the location of the client-computing device 202a, etc.), and identifies a collection of media effects that are compatible with those characteristics. Accordingly, for example, because the subject displayed in the camera viewfinder display includes people, the media effect system 100 would not identify a media effect that is only suitable for a landscape photograph as part of the collection of media effects.

Additionally, as described above, the media effect system 100 ranks the identified media effects based on user characteristics associated with the user of the client-computing device 202a. For example, the media effect system 100 may determine that the user characteristics include that the user has frequently posted to the communications system 206 over the past week regarding the Olympics, that the user resides in the United States of America, and that the user's social networking system friends have recently used media effects in connection with social networking system posts that make it appear as though they are wearing face paint in their "selfies." Based on these user characteristics, the media effect system 100 ranks the identified media effects such that the highest ranked media effects are those most likely to appeal to and be selected by the user of the client-computing device 202a.

For example, as shown in FIG. 3B, the media effect 318a overlays "USA" stickers on the cheeks of the girl shown in the camera viewfinder display 312. In one or more embodiments, the media effect 318a is the top-ranked media effect identified and ranked by the media effect system 100. Accordingly, the media effect system 100 overlays the media effect 318a directly on the camera viewfinder display 312 when the user first opens the application. The user of the client-computing device 202a can select another media effect or layer an additional media effect over the media effect 318a by utilizing one or more of the media effect control 316a. For example, by utilizing the media effect control 316a, the user can select the media effect 318e that overlays "USA" face paint on the forehead of the boy shown in the camera viewfinder display 312.

As discussed above, in one or more embodiments, the media effect system 100 provides a subset of top ranked media effects (e.g., the media effects having a score above a threshold score or a predetermined number of the highest ranked media effects) to the client-computing device 202a. For example, as shown in FIG. 3B, the media effect indicator 320 indicates that the subset of ranked media effects includes five media effects, and that the media effect system 100 is currently displaying the first of the five media effects.

In at least one embodiment, the user of the client-computing device 202a can swipe down vertically on the camera viewfinder display 312 to view additional media effects overlaid on the camera viewfinder display 312. For instance, as shown in FIG. 3C, in response to detecting a series of swipe touch gestures, the media effect system 100 presents the media effect 318b (e.g., a series of hearts) overlaid on the camera viewfinder display 312. In at least one embodiment, the media effect 318b has a lower calculated score than the calculated score of the media effect 318a, but both the media effect 318a and the media effect 318b are within the top threshold percentage of identified media effects. As shown in FIG. 3C, the media effect 318b is the fifth highest ranked media effect as indicated by the media effect indicator 320.

In one or more embodiments, the media effect system 100 uses a different set of characteristics to identify the media effect 318b compared to the characteristics used to identify the media effect 318a. For example, the media effect system 100 can perform facial recognition on the girl and boy shown in the viewfinder. The media effect system 100 can then identify profiles of the communications system for the girl and boy based on the performed facial recognition. Based on the profiles or a social graph as described below, the media effect system 100 can determine that the girl and boy are in a relationship and it is their 1-week anniversary. In response to these and other characteristics, the media effect system 100 can rank the heart media effect 318b as the fifth highest media effect and position a prominent heart about the face of the boy and girl in the viewfinder.

As shown in FIGS. 3B and 3C, the media effect system 100 can provide a preview of the top identified media effects in response to a first type of user input. In at least one embodiment, the media effect system 100 can provide a subset of the ranked plurality of media (e.g., a predetermined number of the media effects with the highest scores or all of the media effects with a score above a threshold score) in response to detecting a second type of user input, such as an overscroll (e.g., the user swipes down on the camera viewfinder display 312 beyond the last preview indicated by the bottom-most media effect indicator 320). In that case, as shown in FIG. 3C, the media effect system 100 can provide a preview along the bottom of the camera viewfinder display 312 of additional ranked media effects 317a-317d that were not in the subset of the ranked plurality of media effects indicated by the media effect indicator 320. In alternative embodiments, the media effect system 100 can provide search capabilities in response to detecting an overscroll, wherein the user can specify one or more search terms relevant to a media effect search. Additionally, in at least one embodiment, the media effect system 100 can remove all media effects from the camera viewfinder display 312 in response to detecting an overscroll beyond the top-most media effect indicator 320.

In another example, in response to detecting a selection of the camera icon 302, as shown in FIG. 3A, the media effect system 100 determines that various client-computing device characteristics include that the rear-facing camera associated with the client-computing device 202a is activated, that the subject portrayed in the camera viewfinder is a landscape, and that the client-computing device 202a is located within the United States of America and it is the fourth of July. Accordingly, immediately upon initialization of the application associated with the camera icon 302, the media effect system 100 overlays the media effect 318c over the camera viewfinder display 312, as shown in FIG. 3D.

As described above with reference to FIGS. 3B and 3C, the media effect 318c is the top-ranked media effect identified by the media effect system 100 based on the current characteristics associated with the client-computing device 202a and the user of the client-computing device 202a. Due to the current user and client-computing device characteristics determined by the media effect system 100, as shown by the media effect indicator 320 in FIGS. 3D and 3E, the subset of ranked media effects includes five media effects. Accordingly, in response to detecting a swipe touch gesture on the camera viewfinder display 312, the media effect system 100 displays the next top-ranked media effect of the subset of ranked media effects. In response to a selection of the shutter button 315, the media effect system 100 creates a media item comprising a digital photograph or video, as shown in the camera viewfinder display 312, overlaid with the media effect(s) (e.g., the media effect 318c) selected by the user.

In one or more embodiments, the media effect system 100 further enables the user of the client-computing device 202a to layer additional media effects on top of the created media item. For example, as shown in FIG. 3E, the shutter button 315 now shown a check-mark, indicating that the media item has been created, and the camera viewfinder display 312 is no longer showing a live camera feed. In this embodiment, the user can layer additional media effects on top of the created media item by utilizing the media effect controls 336a-336d.

For instance, in response to the creation of the media item, the media effect system 100 can present media effect controls 336a, 336b, 336c, 336d. In one or more embodiments and in response to detecting a selection of the media effect controls 336a, the media effect system 100 can delete the media item and again present the live camera feed within the camera viewfinder display 312. In one or more embodiments and in response to detecting a selection of the media effect control 336b, the media effect system 100 can enable the user to add other filters, mask, graphics, media effects, and so forth to the media item. In one or more embodiments and in response to detecting a selection of the media effect control 336c, the media effect system 100 can enable the user to configure and enter text to the media item. Also, in one or more embodiments and in response to detecting a selection of the media effect control 336d, the media effect system 100 can enable the user to configure and draw doodles on the media item.

In one or more embodiments, in response to detecting the selection of the shutter button 315 (either as shown in FIG. 3D or as shown in FIG. 3E), the media effect system 100 creates a media communication including the captured digital photograph or video overlaid with the selected media effect(s). Additionally, in response to creating the media communication, the media effect system 100 provides a post composition GUI 322 on the touch screen display 302 of the client-computing device 202a. in one or more embodiments, the post composition GUI 322 can include a media communication preview and other controls that enable the user to compose a social networking system post. In at least one embodiment, a media communication preview displays the captured digital photograph overlaid with the selected media effect(s) and other selected elements (e.g., filters, graphics, and so forth).

In one embodiment, the post composition GUI 322 can also include controls wherein the user can compose a text message that accompanies the media communication. Furthermore, the post composition GUI 322 can include additional controls whereby the media effect system 100 provides one or more menus or listings of media effects that the user can layer over the media communication. These menus or listings can be organized by rankings or by categories of media effects. Thus, the media effect system 100 enables the user to layer additional media effects prior to capturing the digital photograph or video, as shown in FIG. 3E, or after the media communication has already been created.

Figure 3F:
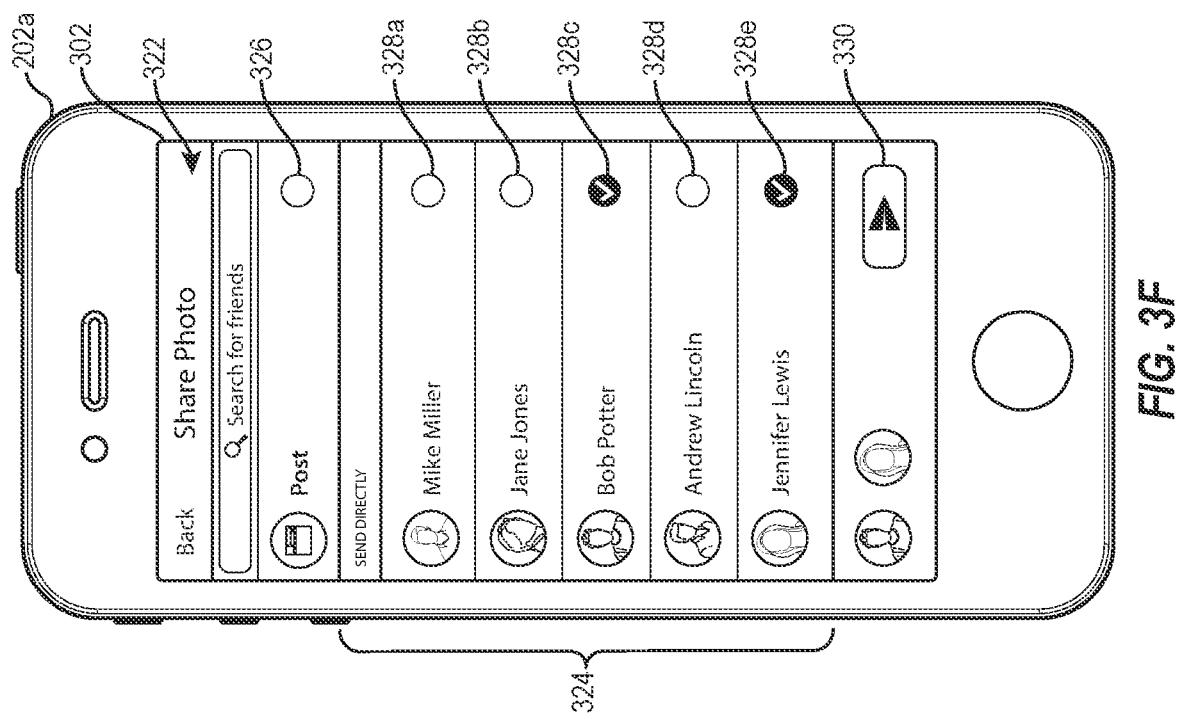

Further, as shown in the embodiment illustrated in FIG. 3F, the post composition GUI 322 includes a list 324 of friends that enables the user to select additional co-users to associate with the media communication and/or social networking system post. For example, in response to a selection of any of the tag controls 328a-328e, the media effect system 100 will provide the media communication and/or social networking system post to the user associated with the selected tag control. Furthermore, as shown in FIG. 3F, the post composition GUI 322 includes a post composition text box 326 that enables the user of the client-computing device 202a to input a social networking system post for display along with the media communication. In additional embodiments, the post composition GUI 322 also includes a location control that enables the user to specify a location in connection with the media communication and/or social networking system post.

Once the user is satisfied with the appearance of the media communication and the contents of the social networking system post, the user may select the share button 330. In response to detecting the selection of the share button 330, the media effect system 100 can send the media item (e.g., the digital photograph or video) together with the selected media effects to another user or the communications system 206. For example, the user can share the media item together with the media effects as a social networking system post and share the generated post with "friends" of the user of the client-computing device 202a. Alternatively, the communications client application 203a can send the media communication directly to one or more co-users specified by the user of the client computing device 202a as a direct message.

FIGS. 1-3F, the corresponding text, and the examples, provide a number of different methods, systems, and devices for ranking and surfacing media effects. In addition to the foregoing, one or more embodiments can also be described in terms of flowcharts comprising acts in a method for accomplishing a particular result. For example, FIG. 4 may be performed with less or more acts or the acts may be performed in differing orders. Additionally, the acts described herein may be repeated or performed in parallel with one another or in parallel with different instances of the same or similar acts.

Figure 4:
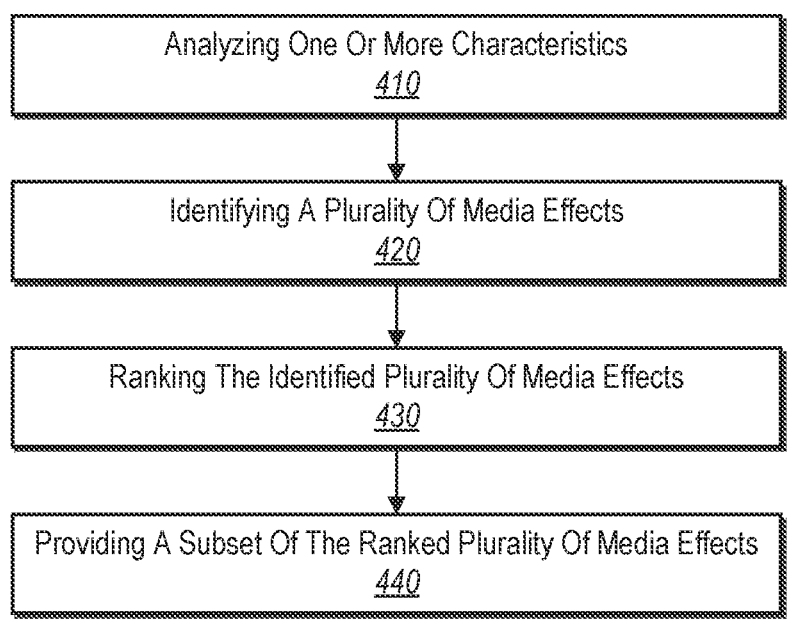
FIG. 4 illustrates a flowchart of a series of acts in a method of ranking media effects in accordance with one or more embodiments.

FIG. 4 illustrates a flowchart of one example method 400 of ranking media effects. The method 400 includes an act 410 of analyzing one or more characteristics. For example, in at least one embodiment, the act 410 involves analyzing one or more characteristics, wherein the one or more characteristics are associated with one or more of a client-computing device 300 and a user of the client-computing device. For example, in at least one embodiment, analyzing the one or more characteristics includes collecting client-computing device information; analyzing the collected client-computing device information to determine at least one characteristic associated with the client-computing device 300; collecting user information; and analyzing the collected user information to determine at least one characteristic associated with the user.

Additionally, the method 400 includes an act 420 of identifying a plurality of media effects 318a-318d. In particular, the act 420 involves identifying, in response to the analysis of the one or more characteristics, a plurality of media effects 318a-318d. For example, identifying a plurality of media effects 318a-318d may be based on the one or more characteristics of the client-computing device 300 and can include identifying media effects 318a-318d that are compatible with at least one of the one or more characteristics of the client-computing device 300. The media effects can comprise one or more of filters, masks, overlays, animations, graphics, or frames.

Furthermore, the method 400 includes an act 430 of ranking the identified plurality of media effects 318a-318d. In particular, the act 430 involves ranking, based on the analysis of the one or more characteristics, the identified plurality of media effects 318a-318d. For example, ranking the identified plurality of media effects 318a-318d can include calculating a score for each of the identified plurality of media effects, wherein the calculated score for a media effect 318a-318d represents a likelihood that the user of the client-computing device 300 will select that media effect 318a-318d. In at least one embodiment, ranking the identified plurality of media effects further includes ordering the scored plurality of media effects from highest score to lowest score. Furthermore, in at least one embodiment, the method 400 includes after ranking the identified plurality of media effects 318a-318d, identifying a subset of the ranked plurality of media effects. The subset can comprise each media effect with a score above a threshold score or a predetermined number of the media effects with the highest scores.

The method 400 also includes an act 440 of providing the ranked plurality of media effects. In particular, the act 440 involves providing a subset of the ranked plurality of media effects. For example, in one embodiment, providing a subset of the ranked plurality of media effects includes automatically overlaying the top-ranked media effect on a camera viewfinder display. Furthermore, in one embodiment, providing the subset of the ranked plurality of media effects is in response to detecting an initialization of a social networking system application or opening a camera viewfinder.

The method 400 can involve detecting a change in the one or more characteristics; identifying an updated plurality of media effects based on the change in the one or more characteristics; ranking the identified updated plurality of media effects; and providing an updated subset of the ranked plurality of media effects. Additionally, or alternatively, the method 400 can involve combining two or more media effects into a combined media effect based on the analysis of the one or more characteristics and providing the combined media effect in the subset of the ranked plurality of media effects.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 5:
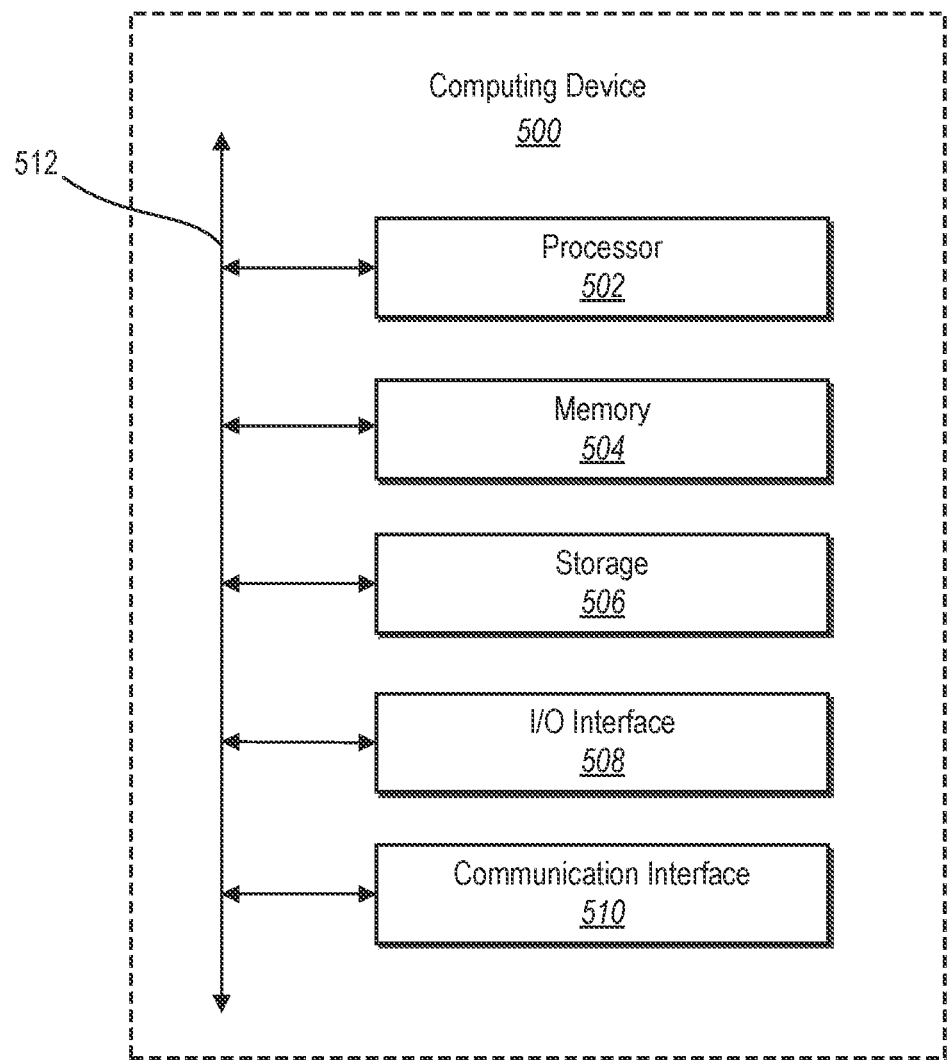
FIG. 5 illustrates a block diagram of an exemplary computing device in accordance with one or more embodiments.

FIG. 5 illustrates a block diagram of exemplary computing device 500 that may be configured to perform one or more of the processes described above. One will appreciate that one or more computing devices such as the computing device 500 may implement the media effect system 100. As shown by FIG. 5, the computing device 500 can comprise a processor 502, a memory 504, a storage device 506, an I/O interface 508, and a communication interface 510, which may be communicatively coupled by way of a communication infrastructure 512. While an exemplary computing device 500 is shown in FIG. 5, the components illustrated in FIG. 5 are not intended to be limiting. Additional or alternative components may be used in other embodiments. Furthermore, in certain embodiments, the computing device 500 can include fewer components than those shown in FIG. 5. Components of the computing device 500 shown in FIG. 5 will now be described in additional detail.

In one or more embodiments, the processor 502 includes hardware for executing instructions, such as those making up a computer program. As an example and not by way of limitation, to execute instructions, the processor 502 may retrieve (or fetch) the instructions from an internal register, an internal cache, the memory 504, or the storage device 506 and decode and execute them. In one or more embodiments, the processor 502 may include one or more internal caches for data, instructions, or addresses. As an example and not by way of limitation, the processor 502 may include one or more instruction caches, one or more data caches, and one or more translation lookaside buffers (TLBs). Instructions in the instruction caches may be copies of instructions in the memory 504 or the storage 506.

The memory 504 may be used for storing data, metadata, and programs for execution by the processor(s). The memory 504 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 504 may be internal or distributed memory.

The storage device 506 includes storage for storing data or instructions. As an example and not by way of limitation, storage device 506 can comprise a non-transitory storage medium described above. The storage device 506 may include a hard disk drive (HDD), a floppy disk drive, flash memory, an optical disc, a magneto-optical disc, magnetic tape, or a Universal Serial Bus (USB) drive or a combination of two or more of these. The storage device 506 may include removable or non-removable (or fixed) media, where appropriate. The storage device 506 may be internal or external to the computing device 500. In one or more embodiments, the storage device 506 is non-volatile, solid-state memory. In other embodiments, the storage device 506 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 508 allows a user to provide input to, receive output from, and otherwise transfer data to and receive data from computing device 500. The I/O interface 508 may include a mouse, a keypad or a keyboard, a touch screen, a camera, an optical scanner, network interface, modem, other known I/O devices or a combination of such I/O interfaces. The I/O interface 508 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 508 is configured to provide graphical data to a display for presentation to a user. The graphical data may be representative of one or more graphical user interfaces and/or any other graphical content as may serve a particular implementation.

The communication interface 510 can include hardware, software, or both. In any event, the communication interface 510 can provide one or more interfaces for communication (such as, for example, packet-based communication) between the computing device 500 and one or more other computing devices or networks. As an example and not by way of limitation, the communication interface 510 may include a network interface controller (NIC) or network adapter for communicating with an Ethernet or other wire-based network or a wireless NIC (WNIC) or wireless adapter for communicating with a wireless network, such as a WI-FI.

Additionally, or alternatively, the communication interface 510 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 510 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 510 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 512 may include hardware, software, or both that couples components of the computing device 500 to each other. As an example and not by way of limitation, the communication infrastructure 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the communications system 206 can comprise a social networking system. A social networking system may enable its users (such as persons or organizations) to interact with the system and with each other. The social networking system may, with input from a user, create and store in the social networking system a user profile associated with the user. The user profile may include demographic information, communication-channel information, and information on personal interests of the user. The social networking system may also, with input from a user, create and store a record of relationships of the user with other users of the social networking system, as well as provide services (e.g., posts, photo-sharing, media effects, event organization, messaging, games, or advertisements) to facilitate social interaction between or among users.

The social networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social networking system. A user may be an individual (human user), an entity (e.g., an enterprise, business, or third party application), or a group (e.g., of individuals or entities). A user node corresponding to a user may comprise information provided by the user and information gathered by various systems, including the social networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social networking system. For example, a concept can represent a real-world entity, such as a movie, a song, a sports team, a celebrity, a group, a restaurant, a media effect, or a place or a location. An administrative user of a concept node corresponding to a concept may create or update the concept node by providing information of the concept (e.g., by filling out an online form), causing the social networking system to associate the information with the concept node. For example, and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social networking system may construct a web page (or a structured document) of a concept node (e.g., a restaurant, a celebrity), incorporating one or more selectable option or selectable elements (e.g., "like", "check in") in the web page. A user can access the page using a web browser hosted by the user's client device and select a selectable option or selectable element, causing the client device to transmit to the social networking system a request to create an edge between a user node of the user and a concept node of the concept, indicating a relationship between the user and the concept (e.g., the user checks in a restaurant, or the user "likes" a celebrity).

As an example, a user may provide (or change) his or her city of residence, causing the social networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social networking system may support a variety of applications, such as photo sharing, on-line calendars and events, gaming, instant messaging, and advertising. For example, the social networking system may also include media sharing capabilities. Also, the social networking system may allow users to post photographs and other multimedia content items to a user's profile page (typically known as "wall posts" or "timeline posts") or in a photo album, both of which may be accessible to other users of the social networking system depending upon the user's configured privacy settings. The social networking system may also allow users to configure events. For example, a first user may configure an event with attributes including time and date of the event, location of the event and other users invited to the event. The invited users may receive invitations to the event and respond (such as by accepting the invitation or declining it). Furthermore, the social networking system may allow users to maintain a personal calendar. Similar to events, the calendar entries may include times, dates, locations and identities of other users.

Figure 6:
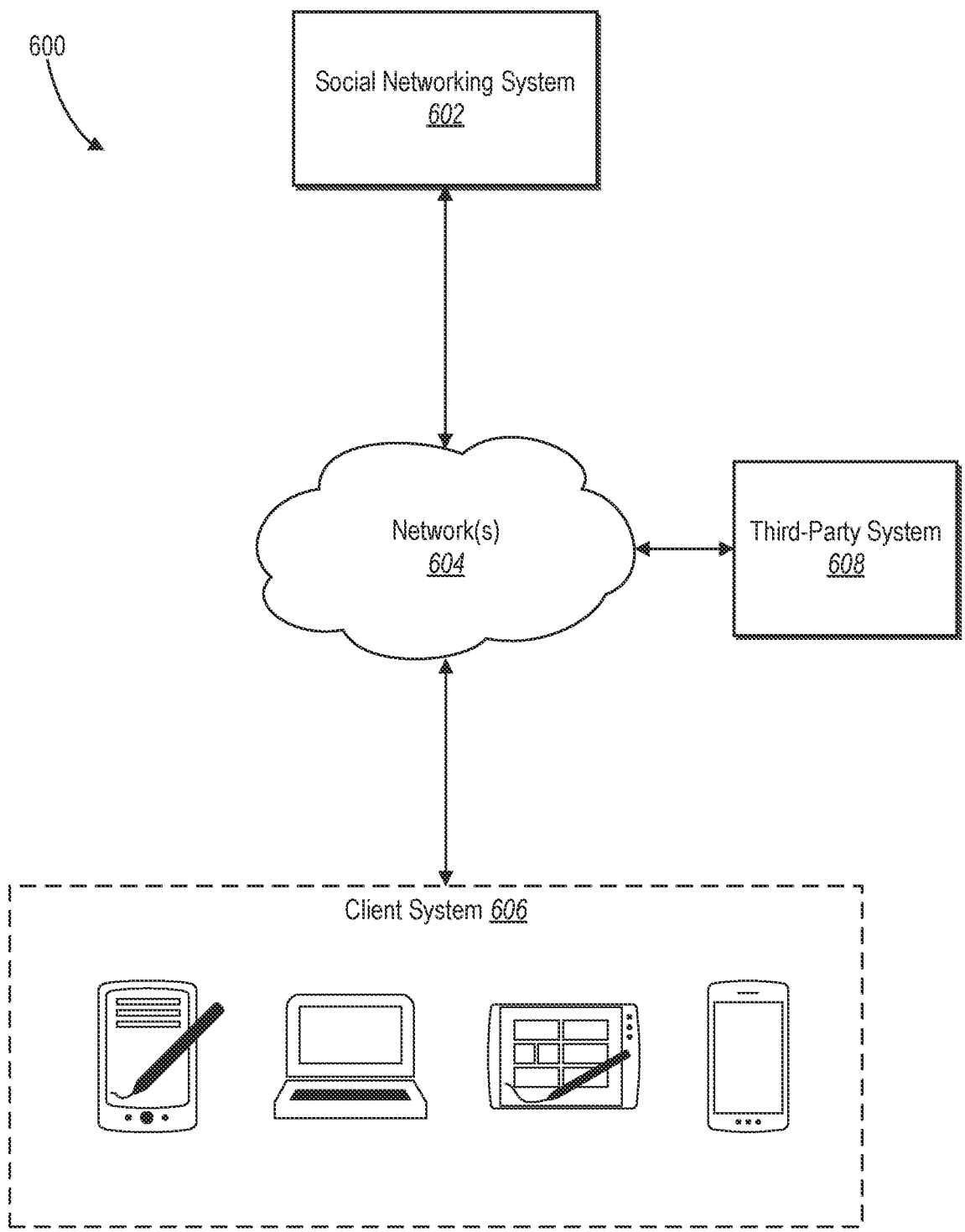
FIG. 6 is an example network environment of a social networking system in accordance with one or more embodiments.

FIG. 6 illustrates an example network environment 600 of a social networking system. Network environment 600 includes a client device 606, a social networking system 602, and a third-party system 608 connected to each other by a network 604. Although FIG. 6 illustrates a particular arrangement of client device 606, social networking system 602, third-party system 608, and network 604, this disclosure contemplates any suitable arrangement of client device 606, social networking system 602, third-party system 608, and network 604. As an example and not by way of limitation, two or more of client device 606, social networking system 602, and third-party system 608 may be connected to each other directly, bypassing network 604. As another example, two or more of client device 606, social networking system 602, and third-party system 608 may be physically or logically co-located with each other in whole or in part. Moreover, although FIG. 6 illustrates a particular number of client devices 606, social networking systems 602, third-party systems 608, and networks 604, this disclosure contemplates any suitable number of client devices 606, social networking systems 602, third-party systems 608, and networks 604. As an example and not by way of limitation, network environment 600 may include multiple client device 606, social networking systems 602, third-party systems 608, and networks 604.

This disclosure contemplates any suitable network 604. As an example and not by way of limitation, one or more portions of network 604 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 604 may include one or more networks 604.

Links may connect client device 606, social networking system 602, and third-party system 608 to communication network 604 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 600. One or more first links may differ in one or more respects from one or more second links.

In particular embodiments, client device 606 may be an electronic device including hardware, software, or embedded logic components or a combination of two or more such components and capable of carrying out the appropriate functionalities implemented or supported by client device 606. As an example and not by way of limitation, a client device 606 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client devices 606. A client device 606 may enable a network user at client device 606 to access network 604. A client device 606 may enable its user to communicate with other users at other client devices 606.

In particular embodiments, client device 606 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client device 606 may enter a Uniform Resource Locator (URL) or other address directing the web browser to a particular server (such as server, or a server associated with a third-party system 608), and the web browser may generate a Hyper Text Transfer Protocol (HTTP) request and communicate the HTTP request to server. The server may accept the HTTP request and communicate to client device 606 one or more Hyper Text Markup Language (HTML) files responsive to the HTTP request. Client device 606 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social networking system 602 may be a network-addressable computing system that can host an online social network. Social networking system 602 may generate, store, receive, and send social-networking data, such as, for example, user-profile data, concept-profile data, social-graph information, or other suitable data related to the online social network. Social networking system 602 may be accessed by the other components of network environment 600 either directly or via network 604. In particular embodiments, social networking system 602 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social networking system 602 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 606, a social networking system 602, or a third-party system 608 to manage, retrieve, modify, add, or delete, the information stored in data store.

In particular embodiments, social networking system 602 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Social networking system 602 may provide users of the online social network the ability to communicate and interact with other users. In particular embodiments, users may join the online social network via social networking system 602 and then add connections (e.g., relationships) to a number of other users of social networking system 602 whom they want to be connected to. Herein, the term "friend" may refer to any other user of social networking system 602 with whom a user has formed a connection, association, or relationship via social networking system 602.

In particular embodiments, social networking system 602 may provide users with the ability to take actions on various types of items or objects, supported by social networking system 602. As an example and not by way of limitation, the items and objects may include groups or social networks to which users of social networking system 602 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social networking system 602 or by an external system of third-party system 608, which is separate from social networking system 602 and coupled to social networking system 602 via a network 604.

In particular embodiments, social networking system 602 may be capable of linking a variety of entities. As an example and not by way of limitation, social networking system 602 may enable users to interact with each other as well as receive content from third-party systems 608 or other entities, or to allow users to interact with these entities through an application programming interfaces (API) or other communication channels.

In particular embodiments, a third-party system 608 may include one or more types of servers, one or more data stores, one or more interfaces, including but not limited to APIs, one or more web services, one or more content sources, one or more networks, or any other suitable components, e.g., that servers may communicate with. A third-party system 608 may be operated by a different entity from an entity operating social networking system 602. In particular embodiments, however, social networking system 602 and third-party systems 608 may operate in conjunction with each other to provide social-networking services to users of social networking system 602 or third-party systems 608. In this sense, social networking system 602 may provide a platform, or backbone, which other systems, such as third-party systems 608, may use to provide social-networking services and functionality to users across the Internet.

In particular embodiments, a third-party system 608 may include a third-party content object provider. A third-party content object provider may include one or more sources of content objects, which may be communicated to a client device 606. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social networking system 602 also includes user-generated content objects, which may enhance a user's interactions with social networking system 602. User-generated content may include anything a user can add, upload, send, or "post" to social networking system 602. As an example and not by way of limitation, a user communicates posts to social networking system 602 from a client device 606. Posts may include data such as status updates or other textual data, location information, photos, videos, links, music or other similar data or media. Content may also be added to social networking system 602 by a third-party through a "communication channel," such as a newsfeed or stream.

In particular embodiments, social networking system 602 may include a variety of servers, sub-systems, programs, modules, logs, and data stores. In particular embodiments, social networking system 602 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social networking system 602 may also include suitable components such as network interfaces, security mechanisms, load balancers, failover servers, management-and-network-operations consoles, other suitable components, or any suitable combination thereof. In particular embodiments, social networking system 602 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social networking system 602 to one or more client devices 606 or one or more third-party system 608 via network 604. The web server may include a mail server or other messaging functionality for receiving and routing messages between social networking system 602 and one or more client devices 606. An API-request server may allow a third-party system 608 to access information from social networking system 602 by calling one or more APIs. An action logger may be used to receive communications from a web server about a user's actions on or off social networking system 602. In conjunction with the action log, a third-party-content-object log may be maintained of user exposures to third-party-content objects. A notification controller may provide information regarding content objects to a client device 606. Information may be pushed to a client device 606 as notifications, or information may be pulled from client device 606 responsive to a request received from client device 606. Authorization servers may be used to enforce one or more privacy settings of the users of social networking system 602. A privacy setting of a user determines how particular information associated with a user can be shared. The authorization server may allow users to opt in to or opt out of having their actions logged by social networking system 602 or shared with other systems (e.g., third-party system 608), such as, for example, by setting appropriate privacy settings. Third-party-content-object stores may be used to store content objects received from third parties, such as a third-party system 608. Location stores may be used for storing location information received from client devices 606 associated with users. Advertisement-pricing modules may combine social information, the current time, location information, or other suitable information to provide relevant advertisements, in the form of notifications, to a user.

Figure 7:
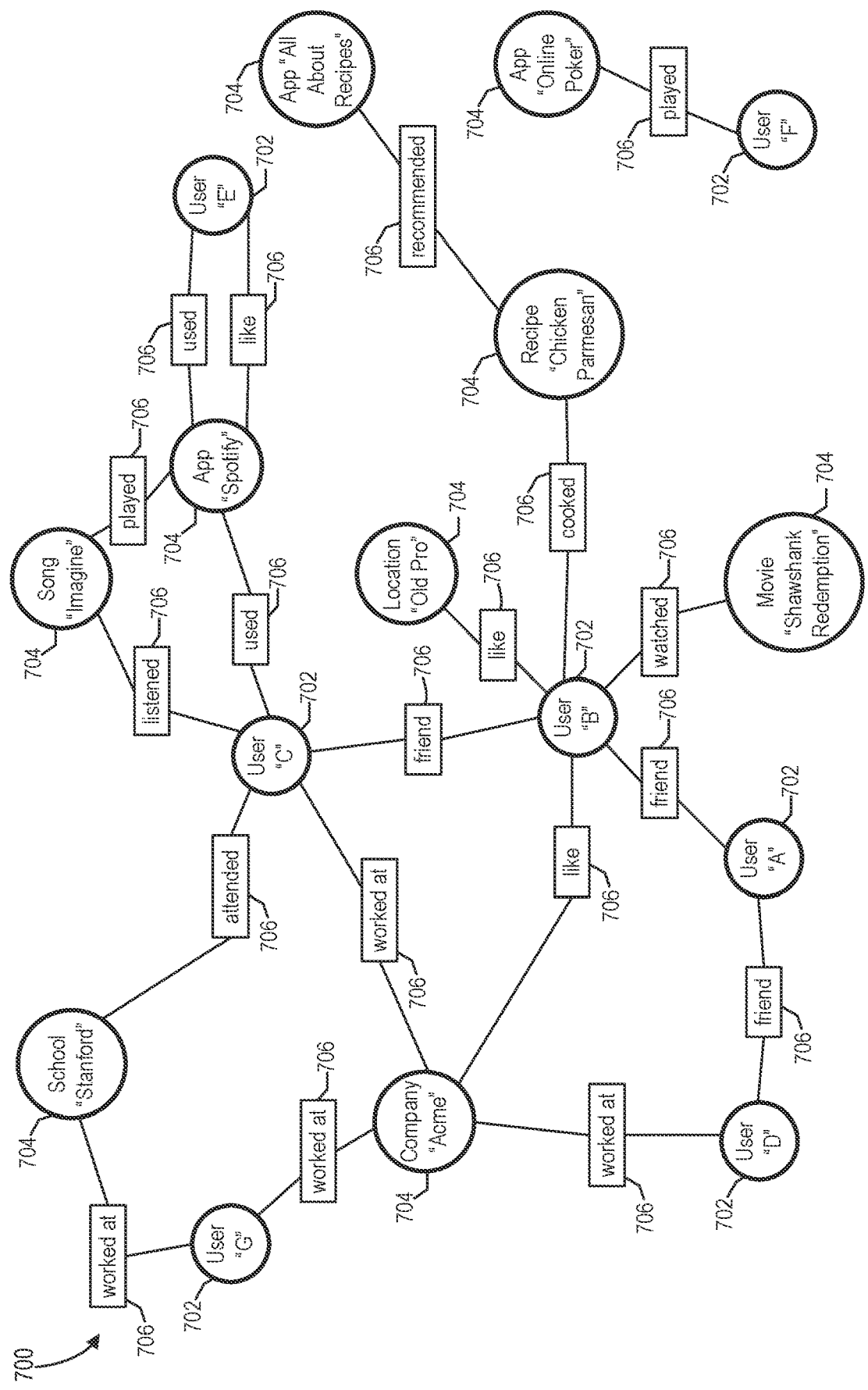
FIG. 7 illustrates a social graph in accordance with one or more embodiments.

FIG. 7 illustrates example social graph 700. In particular embodiments, social networking system 602 may store one or more social graphs 700 in one or more data stores. In particular embodiments, social graph 700 may include multiple nodes—which may include multiple user nodes 702 or multiple concept nodes 704—and multiple edges 706 connecting the nodes. Example social graph 700 illustrated in FIG. 7 is shown, for didactic purposes, in a two-dimensional visual map representation. In particular embodiments, a social networking system 602, client device 606, or third-party system 608 may access social graph 700 and related social-graph information for suitable applications. The nodes and edges of social graph 700 may be stored as data objects, for example, in a data store (such as a social-graph database). Such a data store may include one or more searchable or query able indexes of nodes or edges of social graph 700.

In particular embodiments, a user node 702 may correspond to a user of social networking system 602. As an example and not by way of limitation, a user may be an individual (human user), an entity (e.g., an enterprise, business, or third-party application), or a group (e.g., of individuals or entities) that interacts or communicates with or over social networking system 602. In particular embodiments, when a user registers for an account with social networking system 602, social networking system 602 may create a user node 702 corresponding to the user, and store the user node 702 in one or more data stores. Users and user nodes 702 described herein may, where appropriate, refer to registered users and user nodes 702 associated with registered users. In addition, or as an alternative, users and user nodes 702 described herein may, where appropriate, refer to users that have not registered with social networking system 602. In particular embodiments, a user node 702 may be associated with information provided by a user or information gathered by various systems, including social networking system 602. As an example and not by way of limitation, a user may provide his or her name, profile picture, contact information, birth date, sex, marital status, family status, employment, education background, preferences, interests, or other demographic information. In particular embodiments, a user node 702 may be associated with one or more data objects corresponding to information associated with a user. In particular embodiments, a user node 702 may correspond to one or more webpages.

In particular embodiments, a concept node 704 may correspond to a concept. As an example and not by way of limitation, a concept may correspond to a place (such as, for example, a movie theater, restaurant, landmark, or city); a website (such as, for example, a website associated with social-network system 602 or a third-party website associated with a web-application server); an entity (such as, for example, a person, business, group, sports team, or celebrity); a resource (such as, for example, an audio file, video file, digital photo, text file, structured document, or application) which may be located within social networking system 602 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 704 may be associated with information of a concept provided by a user or information gathered by various systems, including social networking system 602. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 704 may be associated with one or more data objects corresponding to information associated with concept node 704. In particular embodiments, a concept node 704 may correspond to one or more webpages.

In particular embodiments, a node in social graph 700 may represent or be represented by a webpage (which may be referred to as a "profile page"). Profile pages may be hosted by or accessible to social networking system 602. Profile pages may also be hosted on third-party websites associated with a third-party server 608. As an example and not by way of limitation, a profile page corresponding to a particular external webpage may be the particular external webpage and the profile page may correspond to a particular concept node 704. Profile pages may be viewable by all or a selected subset of other users. As an example and not by way of limitation, a user node 702 may have a corresponding user-profile page in which the corresponding user may add content, make declarations, or otherwise express himself or herself. As another example and not by way of limitation, a concept node 704 may have a corresponding concept-profile page in which one or more users may add content, make declarations, or express themselves, particularly in relation to the concept corresponding to concept node 704.

In particular embodiments, a concept node 704 may represent a third-party webpage or resource hosted by a third-party system 608. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client device 606 to send to social networking system 602 a message indicating the user's action. In response to the message, social networking system 602 may create an edge (e.g., an "eat" edge) between a user node 702 corresponding to the user and a concept node 704 corresponding to the third-party webpage or resource and store edge 706 in one or more data stores.

In particular embodiments, a pair of nodes in social graph 700 may be connected to each other by one or more edges 706. An edge 706 connecting a pair of nodes may represent a relationship between the pair of nodes. In particular embodiments, an edge 706 may include or represent one or more data objects or attributes corresponding to the relationship between a pair of nodes. As an example and not by way of limitation, a first user may indicate that a second user is a "friend" of the first user. In response to this indication, social networking system 602 may send a "friend request" to the second user. If the second user confirms the "friend request," social networking system 602 may create an edge 706 connecting the first user's user node 702 to the second user's user node 702 in social graph 700 and store edge 706 as social-graph information in one or more of data stores. In the example of FIG. 7, social graph 700 includes an edge 706 indicating a friend relation between user nodes 702 of user "A" and user "B" and an edge indicating a friend relation between user nodes 702 of user "C" and user "B." Although this disclosure describes or illustrates particular edges 706 with particular attributes connecting particular user nodes 702, this disclosure contemplates any suitable edges 706 with any suitable attributes connecting user nodes 702. As an example and not by way of limitation, an edge 706 may represent a friendship, family relationship, business or employment relationship, fan relationship, follower relationship, visitor relationship, sub scriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 700 by one or more edges 706.

In particular embodiments, an edge 706 between a user node 702 and a concept node 704 may represent a particular action or activity performed by a user associated with user node 702 toward a concept associated with a concept node 704. As an example and not by way of limitation, as illustrated in FIG. 7, a user may "like," "attended," "played," "listened," "cooked," "worked at," or "watched" a concept, each of which may correspond to an edge type or subtype. A concept-profile page corresponding to a concept node 704 may include, for example, a selectable "check in" icon (such as, for example, a clickable "check in" icon) or a selectable "add to favorites" icon. Similarly, after a user clicks these icons, social networking system 602 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social networking system 602 may create a "listened" edge 706 and a "used" edge (as illustrated in FIG. 7) between user nodes 702 corresponding to the user and concept nodes 704 corresponding to the song and application to indicate that the user listened to the song and used the application. Moreover, social networking system 602 may create a "played" edge 706 (as illustrated in FIG. 7) between concept nodes 704 corresponding to the song and the application to indicate that the particular song was played by the particular application. In this case, "played" edge 706 corresponds to an action performed by an external application (SPOTIFY) on an external audio file (the song "Imagine"). Although this disclosure describes particular edges 706 with particular attributes connecting user nodes 702 and concept nodes 704, this disclosure contemplates any suitable edges 706 with any suitable attributes connecting user nodes 702 and concept nodes 704. Moreover, although this disclosure describes edges between a user node 702 and a concept node 704 representing a single relationship, this disclosure contemplates edges between a user node 702 and a concept node 704 representing one or more relationships. As an example and not by way of limitation, an edge 706 may represent both that a user likes and has used at a particular concept. Alternatively, another edge 706 may represent each type of relationship (or multiples of a single relationship) between a user node 702 and a concept node 704 (as illustrated in FIG. 7 between user node 702 for user "E" and concept node 704 for "SPOTIFY").

In particular embodiments, social networking system 602 may create an edge 706 between a user node 702 and a concept node 704 in social graph 700. As an example and not by way of limitation, a user viewing a concept-profile page (such as, for example, by using a web browser or a special-purpose application hosted by the user's client device 606) may indicate that he or she likes the concept represented by the concept node 704 by clicking or selecting a "Like" icon, which may cause the user's client device 606 to send to social networking system 602 a message indicating the user's liking of the concept associated with the concept-profile page. In response to the message, social networking system 602 may create an edge 706 between user node 702 associated with the user and concept node 704, as illustrated by "like" edge 706 between the user and concept node 704. In particular embodiments, social networking system 602 may store an edge 706 in one or more data stores. In particular embodiments, an edge 706 may be automatically formed by social networking system 602 in response to a particular user action. As an example and not by way of limitation, if a first user uploads a picture, watches a movie, or listens to a song, an edge 706 may be formed between user node 702 corresponding to the first user and concept nodes 704 corresponding to those concepts. Although this disclosure describes forming particular edges 706 in particular manners, this disclosure contemplates forming any suitable edges 706 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition, or as an alternative, an advertisement may be one or more sponsored stories (e.g., a news-feed or ticker item on social networking system 602). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition, or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social networking system 602 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social networking system 602) or RSVP (e.g., through social networking system 602) to an event associated with the advertisement. In addition, or as an alternative, an advertisement may include social-networking-system context directed to the user. As an example and not by way of limitation, an advertisement may display information about a friend of the user within social networking system 602 who has taken an action associated with the subject matter of the advertisement.

In particular embodiments, social networking system 602 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 608 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social networking system 602 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social networking system 602 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social networking system 602 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social networking system 602 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social networking system 602 may calculate a coefficient based on a user's actions. Social networking system 602 may monitor such actions on the online social network, on a third-party system 608, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social networking system 602 may calculate a coefficient based on the user's actions with particular types of content. The content may be associated with the online social network, a third-party system 608, or another suitable system. The content may include users, profile pages, posts, news stories, headlines, instant messages, chat room conversations, emails, advertisements, pictures, video, music, other suitable objects, or any combination thereof. Social networking system 602 may analyze a user's actions to determine whether one or more of the actions indicate an affinity for subject matter, content, other users, and so forth. As an example and not by way of limitation, if a user may make frequently posts content related to "coffee" or variants thereof, social networking system 602 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social networking system 602 may calculate a coefficient based on the type of relationship between particular objects. Referencing the social graph 700, social networking system 602 may analyze the number and/or type of edges 706 connecting particular user nodes 702 and concept nodes 704 when calculating a coefficient. As an example and not by way of limitation, user nodes 702 that are connected by a spouse-type edge (representing that the two users are married) may be assigned a higher coefficient than a user node 702 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social networking system 602 may determine that the user has a higher coefficient with respect to the first photo than the second photo because having a tagged-in-type relationship with content may be assigned a higher weight and/or rating than having a like-type relationship with content. In particular embodiments, social networking system 602 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social networking system 602 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 700. As an example and not by way of limitation, social-graph entities that are closer in the social graph 700 (i.e., fewer degrees of separation) may have a higher coefficient than entities that are further apart in the social graph 700.

In particular embodiments, social networking system 602 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client device 606 of the user). A first user may be more interested in other users or concepts that are closer to the first user. As an example and not by way of limitation, if a user is one mile from an airport and two miles from a gas station, social networking system 602 may determine that the user has a higher coefficient for the airport than the gas station based on the proximity of the airport to the user.

In particular embodiments, social networking system 602 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social networking system 602 may provide information that is relevant to user's interests and current circumstances, increasing the likelihood that they will find such information of interest. In particular embodiments, social networking system 602 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social networking system 602 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social networking system 602 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 608 (e.g., via an API or other communication channel), or from another suitable system. In response to the request, social networking system 602 may calculate the coefficient (or access the coefficient information if it has previously been calculated and stored). In particular embodiments, social networking system 602 may measure an affinity with respect to a particular process. Different processes (both internal and external to the online social network) may request a coefficient for a particular object or set of objects. Social networking system 602 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 704 corresponding to a particular photo may have a privacy setting specifying that the photo may only be accessed by users tagged in the photo and their friends. In particular embodiments, privacy settings may allow users to opt in or opt out of having their actions logged by social networking system 602 or shared with other systems (e.g., third-party system 608). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 608, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social networking system 602 may send a request to the data store for the object. The request may identify the user associated with the request and may only be sent to the user (or a client device 606 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A computer-implemented method comprising:
    analyzing, by at least one processor, landscape content depicted within a camera viewfinder display associated with a client device;
    determining, by the at least one processor, a location associated with a client device;
    generating, by the at least one processor, a media effect ranking by ranking a plurality of media effects for overlaying on the camera viewfinder display according to respective compatibilities in relation to the landscape content depicted within the camera viewfinder display and the location associated with the client device;
    determining, by the at least one processor, a media effect from the plurality of media effects for overlaying on the camera viewfinder display utilizing the media effect ranking; and
    presenting, by the at least one processor, the media effect for display together with the landscape content within the camera viewfinder display.

2. The computer-implemented method of claim 1, further comprising identifying a landscape media effect from a repository of media effects stored at a database for the plurality of media effects.

3. The computer-implemented method of claim 1, further comprising:
    selecting the media effect for overlaying on the camera viewfinder display based on user interaction selecting the media effect from the media effect ranking for the plurality of media effects compatible with the landscape content.

4. The computer-implemented method of claim 1, further comprising presenting the media effect for display together with the landscape content within the camera viewfinder display by automatically overlaying a top-ranked media effect on the camera viewfinder display from the media effect ranking.

5. The computer-implemented method of claim 1, further comprising determining a landscape media effect specific to the location associated with the client device for the plurality of media effects.

6. The computer-implemented method of claim 1, wherein presenting the media effect for display together with the landscape content comprises providing the media effect for display on the client device as an overlay of the landscape content depicted within the camera viewfinder display.

7. The computer-implemented method of claim 1, further comprising determining that the camera viewfinder display is depicting the landscape content by identifying the subject matter presented within the camera viewfinder display as landscape content.

8. A system comprising:
    at least one processor; and at least one non-transitory computer-readable storage medium storing instructions thereon that, when executed by the at least one processor, cause the system to:
- analyze, by at least one processor, landscape content depicted within a camera viewfinder display associated with a client device;
- determine, by the at least one processor, a location associated with a client device;
- generate, by the at least one processor, a media effect ranking by ranking a plurality of media effects for overlaying on the camera viewfinder display according to respective compatibilities in relation to the landscape content depicted within the camera viewfinder display and the location associated with the client device;
- determine, by the at least one processor, a media effect from the plurality of media effects for overlaying on the camera viewfinder display utilizing the media effect ranking; and
- present, by the at least one processor, the media effect for display together with the landscape content within the camera viewfinder display.

9. The system of claim 8, further comprising instructions that, when executed by the at least one processor, cause the system to identify a landscape media effect from a repository of media effects stored at a database for the plurality of media effects.

10. The system of claim 8, further comprising instructions that, when executed by the at least one processor, cause the system to
- select the media effect for overlaying on the camera viewfinder display based on user interaction selecting the media effect from the media effect ranking for the plurality of media effects compatible with the landscape content.

11. The system of claim 8, further comprising instructions that, when executed by the at least one processor, cause the system to present the media effect for display together with the landscape content within the camera viewfinder display by automatically overlaying a top-ranked media effect on the camera viewfinder display from the media effect ranking.

12. The system of claim 8, further comprising instructions that, when executed by the at least one processor, cause the system to determine a landscape media effect specific to the location associated with the client device for the plurality of media effects.

13. The system of claim 8, further comprising instructions that, when executed by the at least one processor, cause the system to present the media effect for display together with the landscape content by providing the media effect for display on the client device as an overlay of the landscape content depicted within the camera viewfinder display.

14. The system of claim 8, further comprising instructions that, when executed by the at least one processor, cause the system to determine that the camera viewfinder display is depicting the landscape content by identifying subject matter presented within the camera viewfinder display as landscape content.

15. A non-transitory computer-readable medium storing instructions that, when executed by at least one processor, cause a computing device to:
- analyze, by at least one processor, landscape content depicted within a camera viewfinder display associated with a client device;
- determine, by the at least one processor, a location associated with a client device;
- generate, by the at least one processor, a media effect ranking by ranking a plurality of media effects for overlaying on the camera viewfinder display according to respective compatibilities in relation to the landscape content depicted within the camera viewfinder display and the location associated with the client device;
- determine, by the at least one processor, a media effect from the plurality of media effects for overlaying on the camera viewfinder display utilizing the media effect ranking; and
- present, by the at least one processor, the media effect for display together with the landscape content within the camera viewfinder display.

16. The non-transitory computer-readable medium of claim 15, further comprising instructions that, when executed by the at least one processor, cause the computing device to identify a landscape media effect from a repository of media effects stored at a database for the plurality of media effects.

17. The non-transitory computer-readable medium of claim 15, further comprising instructions that, when executed by the at least one processor, cause the computing device to determine that the camera viewfinder display is depicting the landscape content by identifying subject matter presented within the camera viewfinder display as landscape content.

18. The non-transitory computer-readable medium of claim 15, further comprising instructions that, when executed by the at least one processor, cause the computing device to
- select the media effect for overlaying on the camera viewfinder display based on user interaction selecting the media effect from the media effect ranking for the plurality of media effects compatible with the landscape content.

19. The non-transitory computer-readable medium of claim 15, further comprising instructions that, when executed by the at least one processor, cause the computing device to present the media effect for display together with the landscape content within the camera viewfinder display by automatically overlaying a top-ranked media effect on the camera viewfinder display from the media effect ranking.

20. The non-transitory computer-readable medium of claim 15, further comprising instructions that, when executed by the at least one processor, cause the computing device to determine a landscape media effect specific to the location associated with the client device for the plurality of media effects.

* * * * *